United States Patent [19]

Takeshima et al.

[11] Patent Number: 5,437,153
[45] Date of Patent: Aug. 1, 1995

[54] EXHAUST PURIFICATION DEVICE OF INTERNAL COMBUSTION ENGINE

[75] Inventors: Shinichi Takeshima; Toshiaki Tanaka; Satoshi Iguchi; Yasushi Araki; Shinya Hirota, all of Shizuoka; Tomohiro Oda, Aichi; Fumitada Murakami, Shizuoka, all of Japan

[73] Assignee: Toyota Jidosha Kabushiki Kaisha, Toyota, Japan

[21] Appl. No.: 193,143

[22] PCT Filed: Jun. 10, 1993

[86] PCT No.: PCT/JP93/00778
  § 371 Date: Feb. 14, 1994
  § 102(e) Date: Feb. 14, 1994

[87] PCT Pub. No.: WO93/25806
  PCT Pub. Date: Dec. 23, 1993

[30] Foreign Application Priority Data

Jun. 12, 1992 [JP] Japan .................. 4-177666
Jun. 25, 1992 [JP] Japan .................. 4-190213
Dec. 29, 1992 [JP] Japan .................. 4-361575

[51] Int. Cl.⁶ .................................. F01N 3/20
[52] U.S. Cl. ........................... 60/276; 60/285; 60/286; 60/297; 60/301
[58] Field of Search .......... 60/276, 285, 297, 301, 60/286

[56] References Cited

U.S. PATENT DOCUMENTS

| | | | |
|---|---|---|---|
| 5,174,111 | 12/1992 | Nomura | 60/285 |
| 5,209,061 | 5/1993 | Takeshima | 60/284 |
| 5,233,830 | 8/1993 | Takeshima | 60/301 |
| 5,270,024 | 12/1993 | Kasahara | 60/301 |
| 5,331,809 | 7/1994 | Takeshima | 60/289 |

FOREIGN PATENT DOCUMENTS

| | | |
|---|---|---|
| 560991 | 9/1993 | Germany . |
| 53-115687 | 10/1978 | Japan . |
| 60-182325 | 9/1985 | Japan . |
| 62-9730 | 5/1987 | Japan . |
| 62-10826 | 5/1987 | Japan . |
| 62-117620 | 5/1987 | Japan . |
| 64-30643 | 2/1989 | Japan . |
| 1-56816 | 12/1989 | Japan . |
| 2-149715 | 6/1990 | Japan . |
| 3-124909 | 5/1991 | Japan . |
| 3-135417 | 6/1991 | Japan . |
| 3-194113 | 8/1991 | Japan . |
| 4-1617 | 1/1992 | Japan . |
| 92-01279 | 10/1992 | Japan . |

OTHER PUBLICATIONS

"NO Removal by Absorption into BaO–CuO Binary Oxides"; J. Chem. Soc. Chem. Commun.; P1165–P1166; 1990.

"Formation and Decoposition of $BaCuO_{2.5}$ Prepared from a Mixture of Nitrates"; Journal of Solid State Chemistry; P176–P–179; 1991.

"NO Removal by Absorption into Ba–Cu–O Binary Oxides"; Catalyst vol. 33 No. 2 P87–P90; 1991.

Primary Examiner—Douglas Hart
Attorney, Agent, or Firm—Kenyon & Kenyon

[57] ABSTRACT

A $NO_x$ absorbent (17) is disposed in an exhaust passage of an internal combustion engine. This $NO_x$ absorbent (17) absorbs the $NO_x$ when the air-fuel ratio of the exhaust gas flowing into the $NO_x$ absorbent (17) is lean and releases the absorbed $NO_x$ when the air-fuel ratio of the exhaust gas flowing into the $NO_x$ absorbent (17) becomes rich. It estimates the amount of $NO_x$ absorbed in the $NO_x$ absorbent (17) from the engine load and the engine rotational speed and when the amount of the estimated $NO_x$ becomes the maximum $NO_x$ absorption capacity of the $NO_x$ absorbent (17), makes the air-fuel ratio of the exhaust gas flowing into the $NO_x$ absorbent (17) rich.

37 Claims, 25 Drawing Sheets

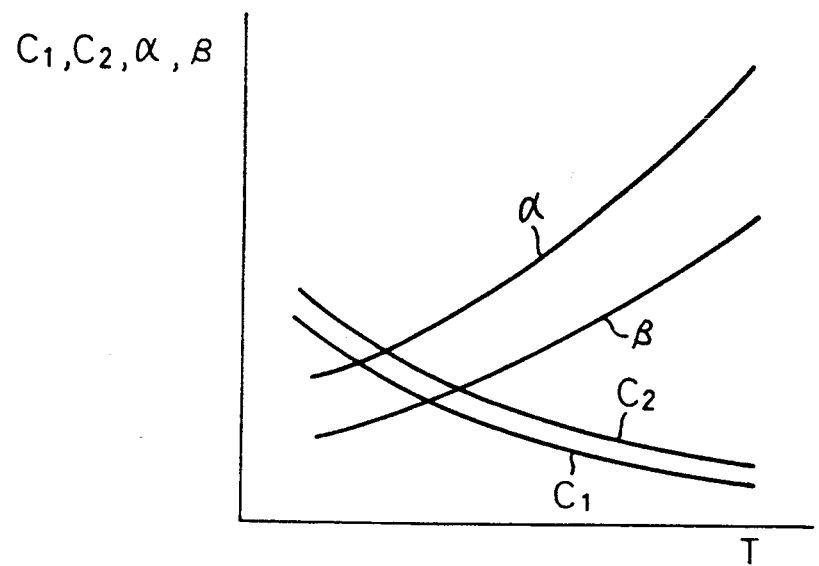

EXHAUST PURIFICATION DEVICE OF INTERNAL COMBUSTION ENGINE

TECHNICAL FIELD

The present invention relates to an exhaust purification device of an internal combustion engine.

BACKGROUND ART

A diesel engine in which an engine exhaust passage is branched to a pair of exhaust branch passages for purifying $NO_x$ in the diesel engine, a switching valve is disposed at the branched portion of these exhaust branch passages, the switching valve is switched each time a predetermined time passes to alternately guide the exhaust gas to one of the exhaust branch passages, and a catalyst which can oxidize and absorb the $NO_x$ is disposed in each of the exhaust branch passages is well known (refer to Japanese Unexamined Patent Publication No. 62-106826). In this diesel engine, the $NO_x$ in the exhaust gas introduced into one exhaust branch passage is oxidized and absorbed by the catalyst disposed in that exhaust branch passage. During this time, the inflow of the exhaust gas to the other exhaust branch passage is stopped and, at the same time, a gaseous reducing agent is fed into this exhaust branch passage. The $NO_x$ accumulated in the catalyst disposed in this exhaust branch passage is reduced by this reducing agent. Subsequently, after the elapse of a predetermined time, the introduction of the exhaust gas to the exhaust branch passage to which the exhaust gas had been introduced heretofore is stopped by the switching function of the switching valve, and the introduction of the exhaust gas to the exhaust branch passage to which the introduction of the exhaust gas had been stopped heretofore is started again. That is, in this diesel engine, seen from the viewpoint of each of the exhaust branch passages, exhaust gas is made to flow for a predetermined time during which the $NO_x$ in the exhaust gas is oxidized and absorbed by the catalyst, then the inflow of exhaust gas is stopped for a predetermined period and a reducing agent is fed, whereby the $NO_x$ accumulated in the catalyst is reduced.

However, the amount of the $NO_x$ which is discharged from the engine changes depending on the operating condition of the engine and therefore the amount of the $NO_x$ which is oxidized and absorbed by the catalyst during the predetermined time when the exhaust gas is flowing changes depending on the operating state of the engine during that period. Accordingly, there is the problem that when an engine operating condition under which a large amount of $NO_x$ is discharged continues, the $NO_x$ oxidizing and absorbing ability of the catalyst ends up becoming saturated during the predetermined time in which the exhaust gas flows and as a result the $NO_x$ can no longer be oxidized and absorbed by the $NO_x$ absorbent, so the $NO_x$ is released into the atmosphere.

As opposed to this, when an engine operating condition in which a small amount of $NO_x$ is discharged continues, only a small amount of $NO_x$ is oxidized and absorbed in the predetermined time in which the exhaust gas flows. Accordingly, in this case, when the inflow of the exhaust gas is stopped and the reducing agent is fed, only part of the reducing agent is used for the reduction of the $NO_x$ and the reducing agent becomes in excess, resulting in the problem of the release of this excess reducing agent into the atmosphere.

DISCLOSURE OF THE INVENTION

An object of the present invention is to provide an exhaust purification device which can reduce well the harmful components released into the atmosphere regardless of the magnitude of the amount of the $NO_x$ discharged from the engine.

According to the present invention, there is provided an exhaust purification device of an internal combustion engine which has in an engine exhaust passage a $NO_x$ absorbent which absorbs the $NO_x$ when the air-fuel ratio of the inflowing exhaust gas is lean and which releases the absorbed $NO_x$ when the oxygen concentration in the inflowing exhaust gas is reduced and which is provided with a $NO_x$ estimating means for estimating the amount of the $NO_x$ absorbed by the $NO_x$ absorbent and a $NO_x$ releasing means for reducing the oxygen concentration in the exhaust gas flowing into the $NO_x$ absorbent and releasing $NO_x$ from the $NO_x$ absorbent when the amount of the $NO_x$ estimated to be absorbed in the $NO_x$ absorbent by the $NO_x$ estimating means exceeds a predetermined allowable value.

BRIEF DESCRIPTION OF THE DRAWINGS

FIG. 10 is a graph showing $C_1$, $C_2$, $\alpha$, and $\beta$;

FIG. 11 is a diagram showing a map of the exhaust gas temperature T;

BEST MODE FOR CARRYING OUT THE INVENTION

Figure 1:
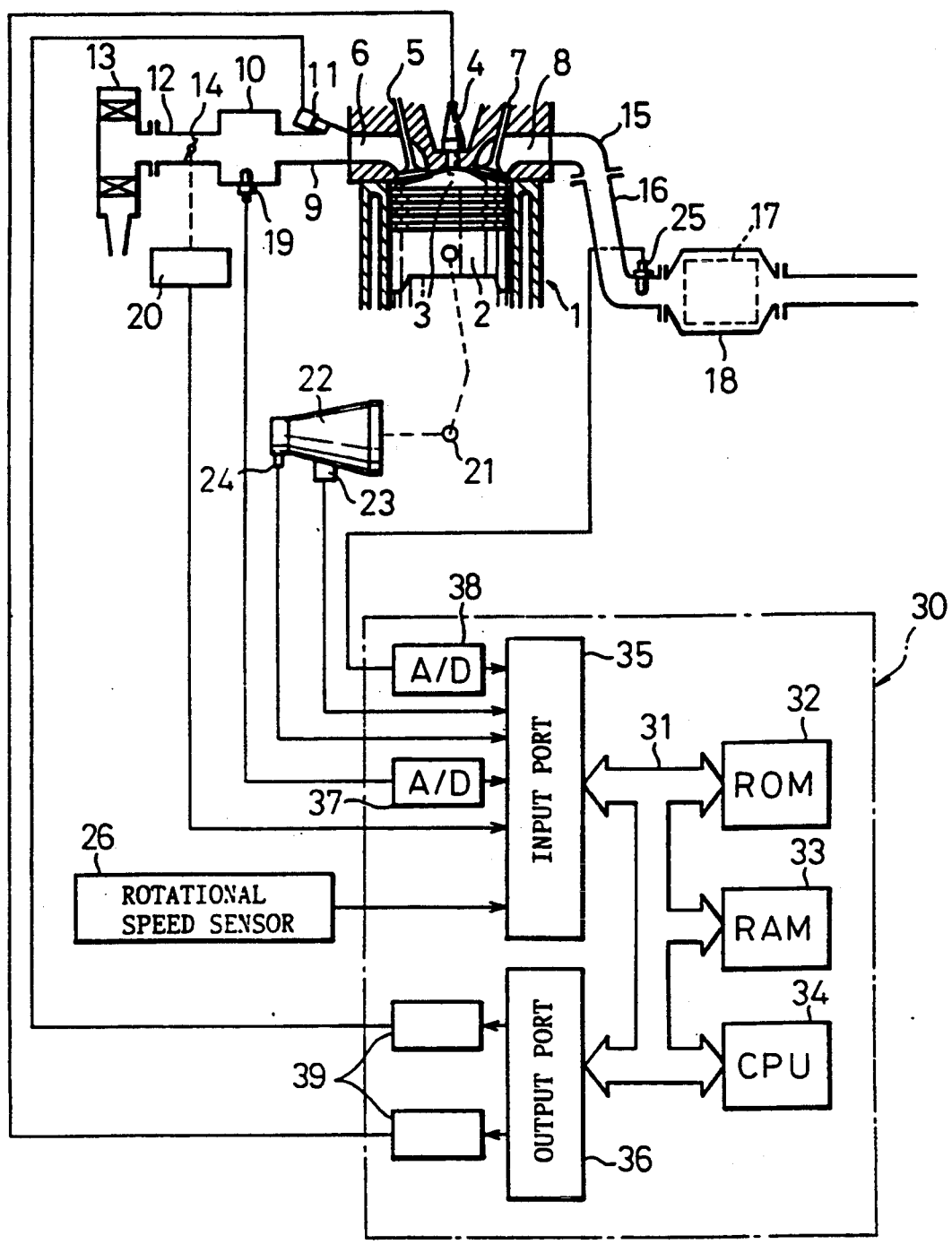
FIG. 1 is an overall view of an internal combustion engine.

FIG. 1 shows a case where the present invention is applied to a gasoline engine.

Referring to FIG. 1, 1 denotes an engine body; 2, a piston; 3, a combustion chamber; 4, a spark plug; 5, an intake valve; 6, an intake port; 7, an exhaust valve; and 8, an exhaust port, respectively. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 13 via an intake duct 12, and a throttle valve 14 is disposed in the intake duct 12. On the other hand, the exhaust port 8 is connected via an exhaust manifold 15 and an exhaust pipe 16 to a casing 18 including a $NO_x$ absorbent 17.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. In the surge tank 10 is mounted a pressure sensor 19 for generating an output voltage proportional to the absolute pressure in the surge tank 10. The output voltage of this pressure sensor 19 is input through an AD converter 37 to the input port 35. Further, the throttle valve 14 has attached to it an idle switch 20 which detects when the throttle valve 14 is open to the idling state. The output signal of this idle switch 20 is input to the input port 35.

On the other hand, a crankshaft 21 has connected to it, for example, an automatic transmission 22. This automatic transmission 22 has attached to it a gear position detector 23 for detecting the position of the transmission gears and a vehicle speed sensor 24 for detecting the speed of the vehicle. The output signals of the gear position detector 23 and the vehicle speed sensor 24 are input to the input port 35. Further, in the exhaust pipe 16 upstream of the casing 18 there is attached a temperature sensor 25 for generating an output voltage proportional to the temperature of the exhaust gas. The output voltage of the temperature sensor 25 is input through an AD converter 38 to the input port 35. Further, the input port 35 has connected to it a rotational speed sensor 26 for generating an output pulse expressing the engine rotational speed. On the other hand, the output port 36 is connected through a corresponding drive circuit 39 to the respective spark plug 4 and fuel injector 11.

Figure 2:
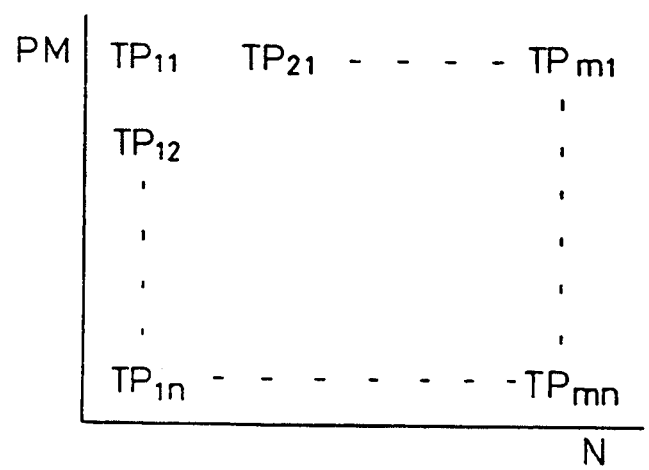
FIG. 2 is a diagram showing a map of a basic fuel injection time.

In the internal combustion engine shown in FIG. 1, the fuel injection time TAU is calculated based on for example the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiments and is stored in advance in the ROM 32 in the form of a map as shown in FIG. 2 as the function of the absolute pressure PM in the surge tank 10 and the engine rotational speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
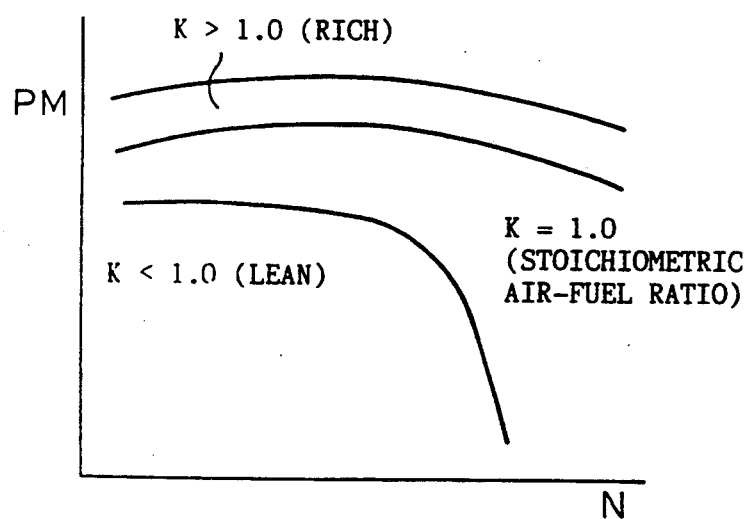
FIG. 3 is a diagram showing a correction coefficient K.

The value of this correction coefficient K is predetermined in relation to the absolute pressure PM in the surge tank 10 and the engine rotational speed N. FIG. 3 shows an embodiment of the value of the correction coefficient K. In the embodiment shown in FIG. 3, in the region where the absolute pressure PM in the surge tank 10 is relatively low, that is, in the engine low and medium load operation region, the value of the correction coefficient K is made a value smaller than 1.0, therefore at this time the air-fuel ratio of the air-fuel mixture fed into the engine cylinder is made lean. On the other hand, in the region where the absolute pressure PM in the surge tank 10 is relatively high, that is, in the engine high load operation region, the value of the correction coefficient is made 1.0. Accordingly, at this time, the air-fuel ratio of the air-fuel mixture fed into the engine cylinder is made the stoichiometric air-fuel ratio. Further, in the region where the absolute pressure PM in the surge tank 10 becomes the highest, that is, in the engine full load operation region, the value of the correction coefficient is made a value larger than 1.0. Therefore, at this time, the air-fuel ratio of the air-fuel mixture fed into the engine cylinder is made rich. An internal combustion engine is usually operated most frequently with a low and medium load and therefore for the majority of the period of operation a lean air-fuel mixture is burned.

Figure 4:
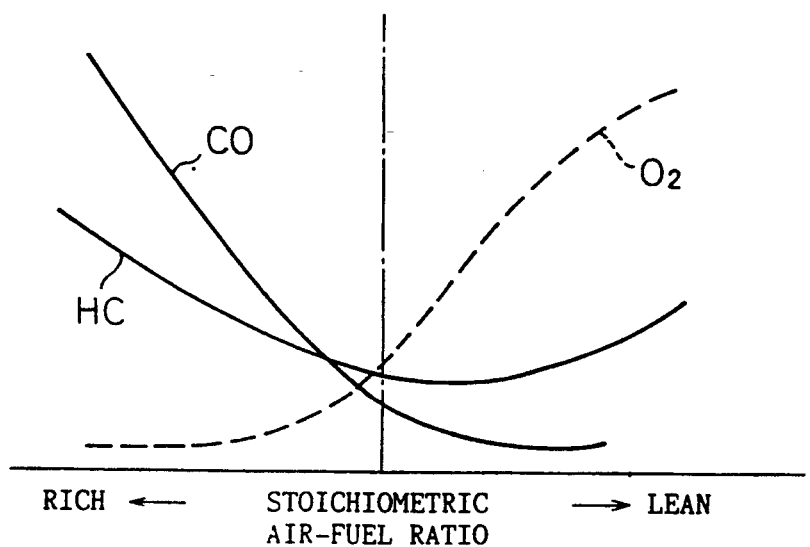
FIG. 4 is a graph schematically showing the concentration of unburnt HC, CO, and oxygen in the exhaust gas discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 17 contained in the casing 18 uses, for example, alumina as a carrier. On this carrier, at least one substance selected from alkali metals, for example, potassium K, sodium Na, lithium Li, and cesium Cs; alkali earths, for example, barium Ba and calcium Ca; and rare earths, for example, lanthanum La and yttrium Y and a precious metal such as platinum Pt are carried. When referring to the ratio between the air and fuel (hydrocarbons) fed into the intake passage of the engine and the exhaust passage upstream of the $NO_x$ absorbent 17 as the air-fuel ratio of the inflowing exhaust gas flowing into the $NO_x$ absorbent 17, this $NO_x$ absorbent 17 performs the absorption and releasing function of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 17, the air-fuel ratio of the inflowing exhaust gas coincides with the air-fuel ratio of the air-fuel mixture fed into the combustion chamber 3, and accordingly in this case, the $NO_x$ absorbent 17 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

When the above-mentioned $NO_x$ absorbent 17 is disposed in the exhaust passage of the engine, this $NO_x$ absorbent 17 actually performs the absorption and releasing function of $NO_x$, but there are areas of the exact mechanism of this absorption and releasing function which are not clear. However, it can be considered that this absorption and releasing function is conducted by the mechanism as shown in FIG. 5. This mechanism will be explained by using as an example a case where platinum Pt and barium Ba are carried on the carrier, but a similar mechanism is obtained even if another precious metal, alkali metal, alkali earth, or rare earth is used.

Figure 5A:
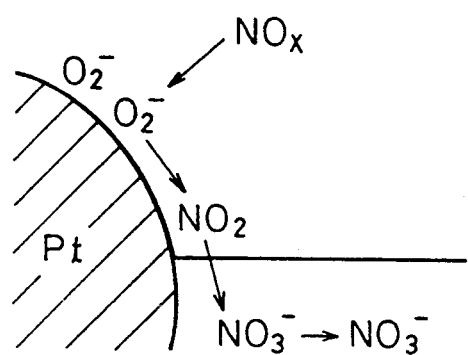
FIG. 5 is a diagram for explaining an absorption and release function of the $NO_x$.

Namely, when the inflowing exhaust gas becomes considerably lean, the concentration of oxygen in the inflowing exhaust gas is greatly increased. As shown in FIG. 5(A), the oxygen $O_2$ is deposited on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5(A). In this way, $NO_x$ is absorbed into the $NO_x$ absorbent 17.

So long as the oxygen concentration in the inflowing exhaust gas is high, the $NO_2$ is produced on the surface of the platinum Pt, and so long as the $NO_x$ absorption ability of the absorbent is not saturated, the $NO_2$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_x^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 17. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 17 even if the air-fuel ratio of the inflowing exhaust gas is lean.

Figure 5B:
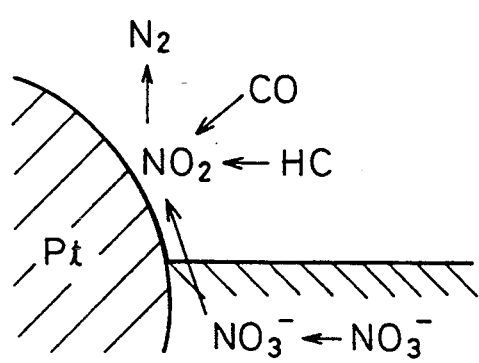

On the other hand, at this time, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO is discharged from the engine, and these unburnt HC and CO react with the oxygen $O_2^-$ or $O^{2-}$ on the platinum Pt and are oxidized. Also, when the air-fuel ratio of the inflowing exhaust gas becomes rich, the oxygen concentration in the inflowing exhaust gas is extremely lowered, and therefore the $NO_2$ is discharged from the absorbent. This $NO_2$ reacts with the unburnt HC and CO as shown in FIG. 5(B) and is reduced. In this way, when the $NO_2$ no longer exists on the surface of the platinum Pt, the $NO_2$ is successively released from the absorbent. Accordingly, when the air-fuel ratio of the inflowing exhaust gas is made rich, the $NO_x$ is released from the $NO_x$ absorbent 19 in a short time.

Namely, when the air-fuel ratio of the inflowing exhaust gas is made rich, first of all, the unburnt HC and CO immediately react with the $O_2^-$ or $O^{2-}$ on the platinum Pt and are oxidized, and subsequently if the unburnt HC and CO still remain even though the $O_2^-$ or $O^{2-}$ on the platinum Pt is consumed, the $NO_x$ released from the absorbent and the $NO_x$ discharged from the engine are reduced by these unburnt HC and CO. Accordingly, when the air-fuel ratio of the inflowing exhaust gas is made rich, the $NO_x$ absorbed in the $NO_x$ absorbent 17 is released in a short time and in addition this released $NO_x$ is reduced, and therefore the discharge of $NO_x$ into the atmosphere can be blocked. Also, since the $NO_x$ absorbent 17 has the function of a reduction catalyst, even if the air-fuel ratio of the inflowing exhaust gas is made the stoichiometric air-fuel ratio, the $NO_x$ released from the $NO_x$ absorbent 17 can be reduced. However, where the air-fuel ratio of the inflowing exhaust gas is made the stoichiometric air-fuel ratio, the $NO_x$ is released merely gradually from the $NO_x$ absorbent 17, and therefore a slightly long time is required for releasing all $NO_x$ absorbed in the $NO_x$ absorbent 17.

When the degree of leanness of the inflowing exhaust gas is lowered as mentioned before, even if the air-fuel ratio of the inflowing exhaust gas is lean, the $NO_x$ is released from the $NO_x$ absorbent 17. Accordingly, so as to release the $NO_x$ from the $NO_x$ absorbent 17, it is satisfactory if the concentration of oxygen in the inflowing exhaust gas is lowered. Note, even if the $NO_x$ is released from the $NO_x$ absorbent 17, when the air-fuel ratio of the inflowing exhaust gas is lean, the $NO_x$ is not reduced in the $NO_x$ absorbent 17, and accordingly, in this case, it is necessary to provide a catalyst which can reduce the $NO_x$ downstream of the $NO_x$ absorbent 17 or supply a reducing agent downstream of the $NO_x$ absorbent 17. Of course, it is also possible to reduce the $NO_x$ downstream of the $NO_x$ absorbent 17 in this way, but it is rather preferable that the $NO_x$ be reduced in the $NO_x$ absorbent 17. Accordingly, in the embodiment according to the present invention, when the $NO_x$ should be released from the $NO_x$ absorbent 17, the air-fuel ratio of the inflowing exhaust gas is made rich, whereby the $NO_x$ released from the $NO_x$ absorbent 17 is reduced in the $NO_x$ absorbent 17.

However, in the embodiment according to the present invention, as mentioned above, during full load operation, the air-fuel mixture fed into the engine cylinder 3 is made rich and during high load operation, the air-fuel mixture is made the stoichiometric air-fuel ratio, so during the full load operation and the high load operation, the $NO_x$ is released from the $NO_x$ absorbent 17. However, if the frequency of this full load operation or high load operation is small, then even if the $NO_x$ is released from the $NO_x$ absorbent 17 only during full load operation and high load operation, the absorption capacity of the $NO_x$ by the $NO_x$ absorbent 17 will end up becoming saturated during the time when a lean air-fuel mixture is burnt and therefore it will end up becoming impossible for the $NO_x$ absorbent 17 to absorb the $NO_x$. Accordingly, in the embodiment according to the present invention, when a lean air-fuel mixture continues to be burnt, the air-fuel mixture fed into the combustion chamber 3 is cyclically made rich and during this time the $NO_x$ is released from the $NO_x$ absorbent 17.

In this case, however, if the cycle at which the air-fuel mixture fed into the engine cylinder 3 is made rich is long, then the $NO_x$ absorbing capacity of the $NO_x$ absorbent 17 will end up becoming saturated during the time the lean air-fuel mixture is being burnt and therefore the $NO_x$ can no longer be absorbed in the $NO_x$ absorbent 17, so there will be the problem that $NO_x$ will end up being released into the atmosphere. As opposed to this, even if an engine operating state where a large amount of $NO_x$ is discharged from the engine continues, if the cycle at which the air-fuel mixture is made lean is shortened so that the $NO_x$ is released from the $NO_x$ absorbent 17 before the $NO_x$ absorbing capacity of the $NO_x$ absorbent 17 becomes saturated, then this time the problem will arise of an increase of the amount of fuel consumption.

Therefore, in the present invention, the amount of $NO_x$ which is absorbed in the $NO_x$ absorbent 17 is found and the air-fuel mixture is made rich when the amount of the $NO_x$ absorbed in the $NO_x$ absorbent 17 exceeds a predetermined allowable value. If the air-fuel mixture is made rich when the amount of the $NO_x$ absorbed in the $NO_x$ absorbent 17 exceeds a predetermined allowable value, then the $NO_x$ absorbing capacity of the $NO_x$ absorbent 17 will never become saturated, so the $NO_x$ will no longer be released into the atmosphere and, further, the frequency at which the air-fuel mixture is made rich can be reduced as well, so it is possible to suppress an increase in the amount of the fuel consumption.

However, when finding the amount of $NO_x$ being absorbed in the $NO_x$ absorbent 17, it is difficult to directly find the amount of $NO_x$ being absorbed in the $NO_x$ absorbent 17. Therefore, in the present invention, the amount of the $NO_x$ absorbed in the $NO_x$ absorbent 17 is estimated from the amount of $NO_x$ in the exhaust gas discharged from the engine. That is, the higher the rotational speed N of the engine, the larger the amount of exhaust gas discharged per unit time from the engine, so as the engine rotational speed N becomes higher, the amount of $NO_x$ discharged from the engine per unit time increases. Further, the higher the engine load, that is, the higher the absolute pressure PM in the surge tank 10, the greater the amount of the exhaust gas discharged from the combustion chambers 3 and further the higher the combustion temperature, so the higher the engine load, that is, the higher the absolute pressure PM in the surge tank 10, the greater the amount of $NO_x$ discharged from the engine per unit time.

Figure 6A:
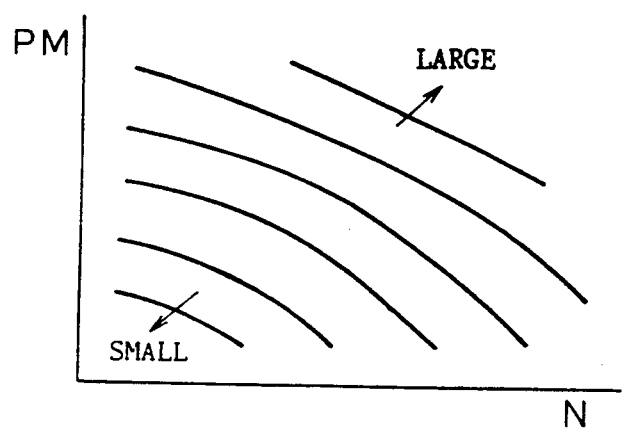
FIG. 6 is a diagram showing the amount of $NO_x$ discharged from the engine.
Figure 6B:
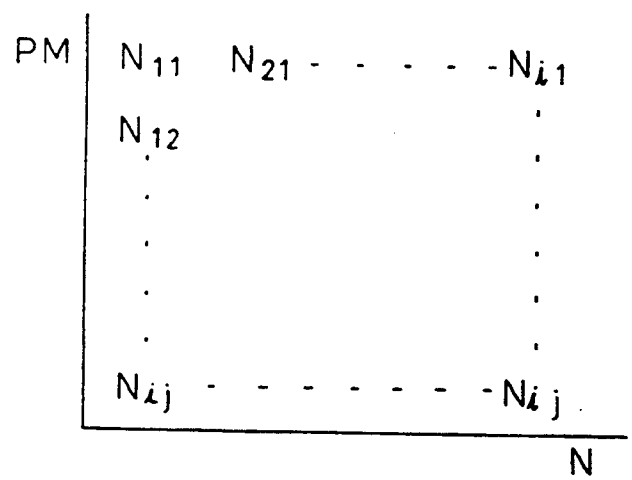

FIG. 6(A) shows the relationship between the amount of the $NO_x$ discharged from the engine per unit time, the absolute pressure PM in the surge tank 10, and the engine rotational speed N as found by experiments. In FIG. 6(A), the curves show the identical amounts of $NO_x$. As shown in FIG. 6(A), the amount of $NO_x$ discharged from the engine per unit time becomes larger the higher the absolute pressure PM in the surge tank 10 and becomes larger the higher the engine rotational speed N. Note that the amount of $NO_x$ shown in FIG. 6(A) is stored in the ROM 32 in advance in the form of a map as shown in FIG. 6(B).

Figure 7:
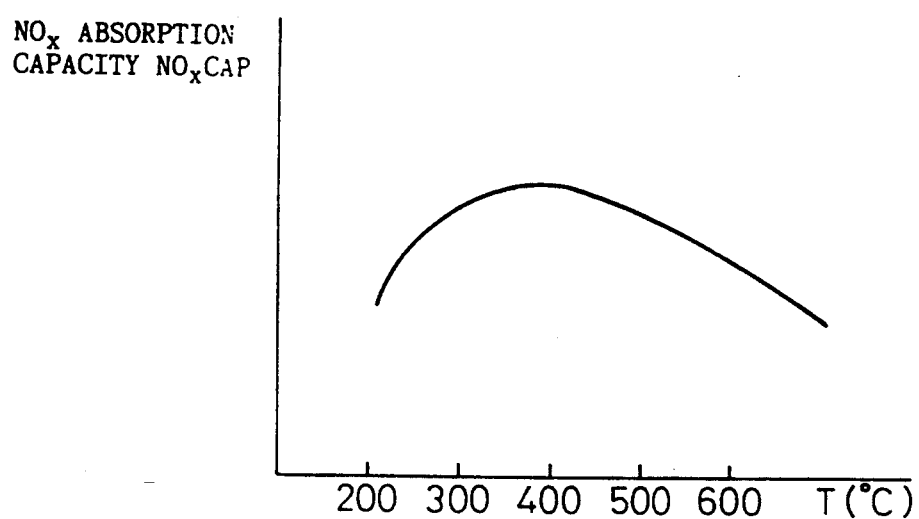
FIG. 7 is a graph showing the capacity of absorption of $NO_x$ of the $NO_x$ absorbent.

On the other hand, FIG. 7 shows the relationship between the absorption capacity $NO_xCAP$ which can be absorbed by the $NO_x$ absorbent 17 and the temperature T of the exhaust gas, which represents the temperature of the $NO_x$ absorbent 17. If the temperature of the $NO_x$ absorbent 17 becomes lower, that is, the temperature T of the exhaust gas becomes lower, the oxidation action of the $NO_x$ ($2NO + O_2 \rightarrow 2NO_2$) is weakened, and therefore the $NO_x$ absorption capacity $NO_xCAP$ is lowered. Further, if the temperature of the $NO_x$ absorbent 17 becomes higher, that is, the temperature T of the exhaust gas becomes higher, the $NO_x$ absorbed in the $NO_x$ absorbent 17 is decomposed and naturally released, so the $NO_x$ absorption capacity $NO_xCAP$ is lowered. Accordingly, the $NO_x$ absorption capacity $NO_xCAP$ becomes larger between about 300° C. to about 500° C.

Figure 8:
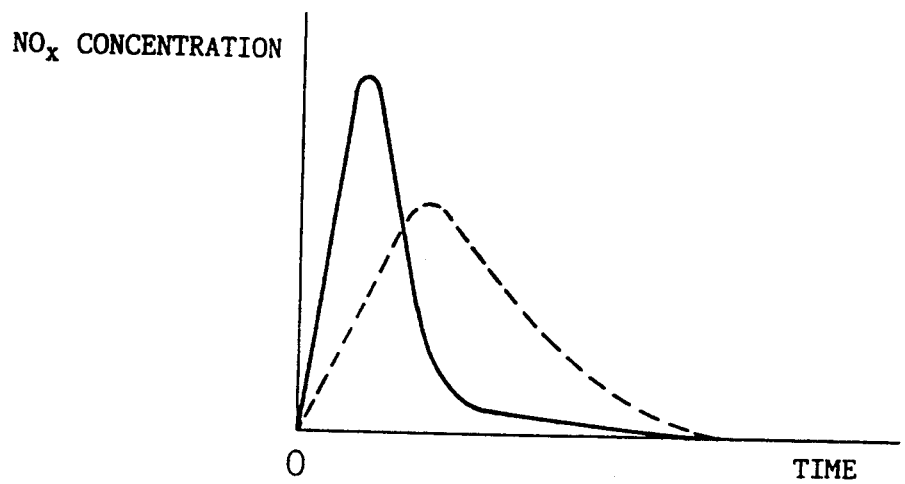
FIG. 8 is a graph showing the characteristics of release of $NO_x$.

On the other hand, FIG. 8 shows the results of experiments on the amount of $NO_x$ released from the $NO_x$ absorbent 17 when switching the air-fuel ratio of the exhaust gas flowing into the $NO_x$ absorbent 17 from lean to rich. Note that the solid line in FIG. 8 shows the state when the temperature of the $NO_x$ absorbent 17, that is, the temperature T of the exhaust gas, is high, while the broken line shows when the temperature of the $NO_x$ absorbent 17, that is, the temperature T of the exhaust gas, is low. The rate of decomposition of the $NO_x$ in the $NO_x$ absorbent 17 becomes faster the higher the temperature of the $NO_x$ absorbent 17. Therefore, when the temperature of the $NO_x$ absorbent 17 is high, as shown by the solid line in FIG. 8, that is, when the temperature T of the exhaust gas is high, a large amount of $NO_x$ is released from the $NO_x$ absorbent 17 in a short time, while when the temperature of the $NO_x$ absorbent 17, that is, the temperature T of the exhaust gas, is low, as shown by the broken line in FIG. 8, a small amount of $NO_x$ is continually released from the $NO_x$ absorbent 17 over a long period. That is, the higher the temperature T of the exhaust gas, the greater the amount of $NO_x$ released from the $NO_x$ absorbent 17 per unit time and the shorter the release time of the $NO_x$.

When the amount of the unburnt HC and CO discharged from the engine, however, is smaller than the amount which can reduce the total $NO_x$ released from the $NO_x$ absorbent 17, part of the $NO_x$ is released into the atmosphere without being reduced, while when the amount of unburnt HC and CO discharged from the engine is greater than the amount able to reduce the total $NO_x$ released from the $NO_x$ absorbent 17, the excess unburnt HC and CO are released into the atmosphere. Accordingly, to prevent the $NO_x$ and the unburnt HC and CO from being released into the atmosphere, it is necessary to discharge exactly the amount of the unburnt HC and CO from the engine needed to reduce the $NO_x$ released from the $NO_x$ absorbent 17. Toward this end, it becomes necessary to increase the amount of the unburnt HC and CO in accordance with the curve shown in FIG. 8.

Figure 9:
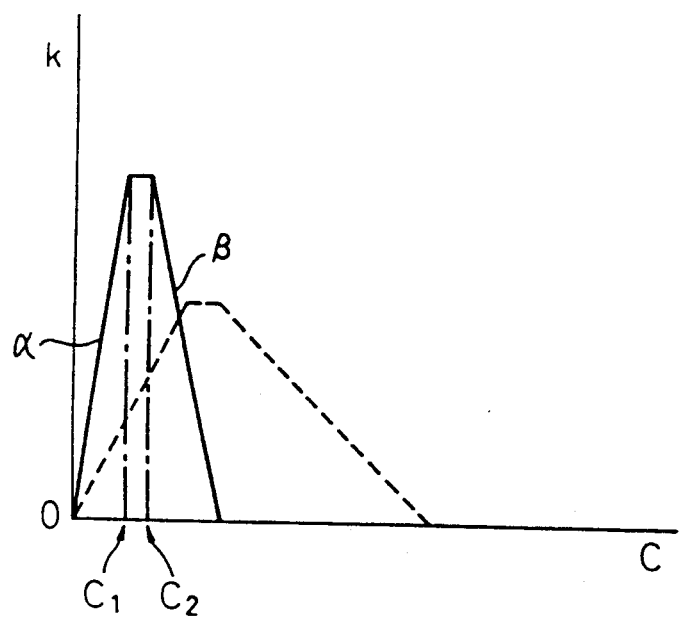
FIG. 9 is a graph showing the change in the correction coefficient K.

As mentioned earlier, however, the amount of the unburnt HC and CO discharged from the engine is proportional to the degree of richness of the air-fuel mixture fed into the combustion chamber 3. Therefore, in the embodiment according to the present invention, as shown in FIG. 9, the value of the correction coefficient k with respect to the basic fuel injection time TP, that is, the degree of richness of the air-fuel mixture, is made to change in accordance with a pattern as close as possible to the pattern of change of the concentration of $NO_x$ shown in FIG. 8. Note that here, the correction coefficient k has the relationship K=1+k with the above-mentioned correction coefficient K and therefore when k=0, the air-fuel mixture becomes the stoichiometric air-fuel ratio while when k>0, the air-fuel mixture becomes rich.

As shown by the solid line in FIG. 9, when the $NO_x$ is to be released from the $NO_x$ absorbent 17, the correction coefficient k is made to rise by $\alpha$ increments with each passing of the unit time until the time C reaches $C_1$. Next, when the time C is between $C_1$ and $C_2$, the correction coefficient k is held constant, then when the time C exceeds $C_2$, the correction coefficient k is made to descend in $\beta$ decrements with each unit time. The values of these $\alpha$, $\beta$, $C_1$, and $C_2$ are set so that the pattern of change of the correction coefficient k becomes as close as possible to the pattern of change of the concentration of $NO_x$ shown by the solid line in FIG. 8.

On the other hand, the pattern of change of the correction coefficient k when the temperature of the $NO_x$ absorbent 17, that is, the temperature T of the exhaust gas, is low, is also set so that it becomes as close as possible to the pattern of change of the concentration of $NO_x$ when the temperature T of the exhaust gas is low, as shown by the broken line in FIG. 8. In this case, to make the pattern of change of the correction coefficient k in FIG. 9 like the broken line, it is understood that it is sufficient to make both $\alpha$ and $\beta$ smaller and make $C_1$ and $C_2$ larger. That is, to make the pattern of change of the correction coefficient k close to the pattern of change of the concentration of $NO_x$ shown in FIG. 8, it is sufficient to make $\alpha$ and $\beta$ larger and make $C_1$ and $C_2$ smaller as the temperature T of the exhaust gas becomes higher, as shown in FIG. 10. Note that the relationship between $C_1$, $C_2$, $\alpha$, and $\beta$ and the temperature T of the exhaust gas shown in FIG. 10 is stored in advance in the ROM 32.

Note that in the embodiment according to the present invention, provision is made of a temperature sensor 25 for detecting the temperature T of the exhaust gas and accordingly the $NO_x$ absorption capacity $NO_x$ CAP shown in FIG. 7 and the $\alpha$, $\beta$, $C_1$, and $C_2$ shown in FIG. 10 are determined based on the temperature T of the exhaust gas detected by this temperature sensor 25. The temperature T of the exhaust gas, however, can be estimated from the absolute pressure PM in the surge tank 10 and the engine rotational speed N. Therefore, instead of providing the temperature sensor 25, it is possible to store the temperature T of the exhaust gas in the ROM 32 in advance in the form of a map as shown in FIG. 11 and determine the $NO_x$ absorption capacity $NO_x$ CAP and $\alpha$, $\beta$, $C_1$, and $C_2$ based on the temperature T of the exhaust gas obtained from this map.

Next, an explanation will be made of the first embodiment of control of the release of $NO_x$ with reference to FIG. 12 to FIG. 14.

Figure 12:
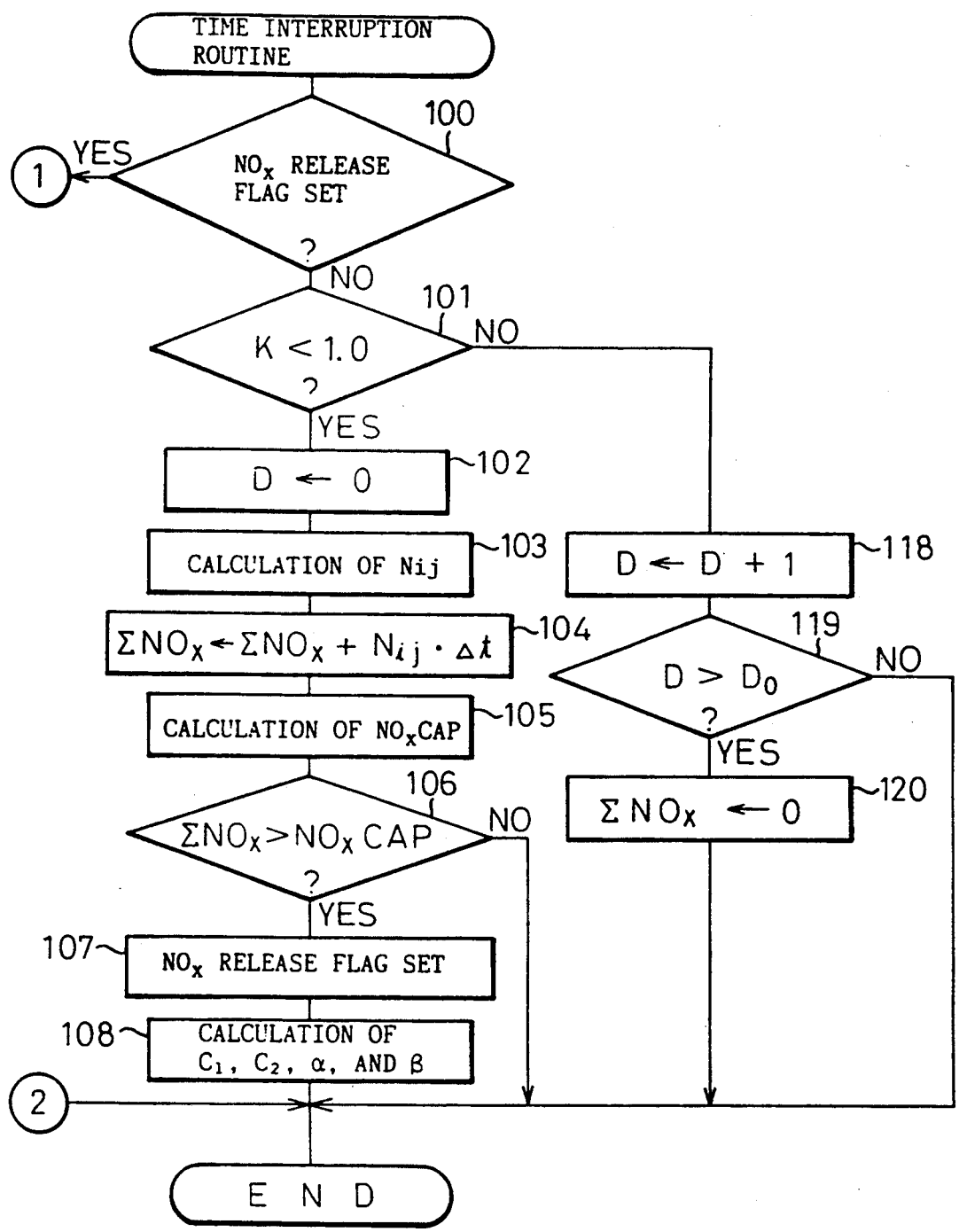
FIG. 12 and FIG. 13 are flow charts showing a time interruption routine.
Figure 13:
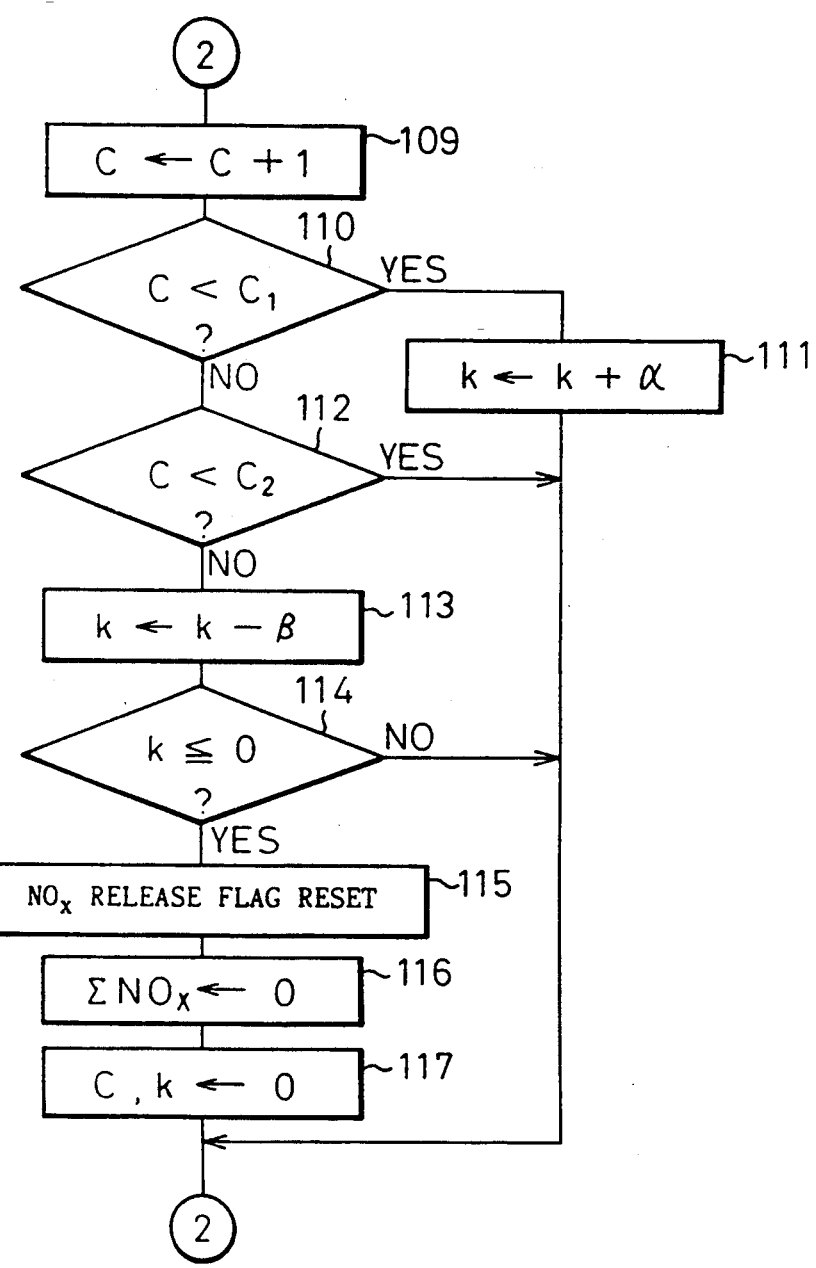

FIG. 12 and FIG. 13 show a time interruption routine executed by interruption every predetermined time.

Referring to FIG. 12 and FIG. 13, first, at step 100, it is judged if a $NO_x$ release flag showing that the $NO_x$ should be released from the $NO_x$ absorbent 17 is set or not. When the $NO_x$ release flag is not set, the routine proceeds to step 101, where it is judged if the correction coefficient K is smaller than 1.0, that is, if the operating state is one in which the air-fuel mixture should be made lean. When K<1.0, that is, when the operating state is one in which the air-fuel mixture should be made lean, the routine proceeds to step $k_2$, where the count D is made zero, then the routine proceeds to step 103.

At step 103, the $NO_x$ amount Nij discharged from the engine per unit time is calculated from the map shown in FIG. 6(B) based on the absolute pressure PM in the surge tank 10, detected by the pressure sensor 19, and the engine rotational speed N. Next, at step 104, the $NO_x$ amount Nij is multiplied by the interruption time interval $\Delta t$ and the product Nij·$\Delta T$ is added to $\Sigma NO_x$. The product Nij·$\Delta t$ shows the amount of the $NO_x$ discharged from the engine during the interruption time interval $\Delta t$. At this time, the $NO_x$ discharged from the engine is absorbed by the $NO_x$ absorbent 17, so $\Sigma NO_x$ shows the estimated value of the amount of $NO_x$ absorbed in the $NO_x$ absorbent 17.

Next, at step 105, the $NO_x$ absorption capacity $NO_x$ CAP is calculated from the relationship shown in FIG. 7 based on the temperature T of the exhaust gas detected by the temperature sensor 25. Next, at step 106, it is judged if the estimated value $\Sigma NO_x$ of the amount of $NO_x$ absorbed in the $NO_x$ absorbent 17 has exceeded the $NO_x$ absorption capacity $NO_x$CAP. When $\Sigma NO_x \leq NO_x$CAP, the processing cycle is completed. At this time, a lean air-fuel mixture is burned and the $NO_x$ discharged from the engine is absorbed in the $NO_x$ absorbent 17.

On the other hand, if it is judged at step 106 that $\Sigma NO_x > NO_x$CAP, that is, the $NO_x$ absorption capacity of the $NO_x$ absorbent 17 is saturated, the routine proceeds to step 107, where the $NO_x$ release flag is set. Next, at step 108, $C_1$, $C_2$, $\alpha$, and $\beta$ are calculated from the relation shown in FIG. 10 based on the temperature T of the exhaust gas and the processing cycle is ended. If the $NO_x$ release flag is set, at the next processing cycle, the routine proceeds from step 100 to step 109, where the count C is incremented by one. Next, at step 110, it is judged if the count C is smaller than $C_1$. When C<$C_1$, the routine proceeds to step 111, where $\alpha$ is added to the correction coefficient k. Next, the processing cycle is ended. The action of addition of $\alpha$ to the correction coefficient k is performed continuously until C$\geq C_1$. Accordingly, the value of the correction coefficient k during this time continues to increase as shown in FIG. 9.

On the other hand, if it is judged at step 110 that C$\geq C_1$, the routine proceeds to step 112, where it is judged if the count C has become smaller than $C_2$. When C<$C_2$, the processing cycle is ended. Therefore, as shown in FIG. 9, the correction coefficient k is held constant until C$\geq C_2$.

Next, at step 112, when it is judged that C$\geq C_2$, the routine proceeds to step 113, where $\beta$ is subtracted from the correction coefficient k. Next, at step 113, it is judged if the correction coefficient k has become zero or a negative number. When k>0, the processing cycle is ended. Accordingly, as shown in FIG. 9, the correction coefficient k is reduced until k$\leq$0. Note that, as mentioned later, if k>0, the air-fuel mixture fed to the combustion chamber 3 is made rich and during this time the degree of richness is changed by the pattern shown in FIG. 9.

On the other hand, if it is judged at step 114 that K$\leq$0, the routine proceeds to step 115, where the $NO_x$ release flag is reset. Next, at step 116, $\Sigma NO_x$ is made zero. That is, at this time, it is considered that all of the $NO_x$ which had been absorbed in the $NO_x$ absorbent 17 is released, so the estimated value $\Sigma NO_x$ of the $NO_x$ absorbed in the $NO_x$ absorbent 17 is made zero. Next, at step 117, the count C and the correction coefficient k are made zero and the processing cycle is ended.

On the other hand, if it is judged at step 101 that $k \geq 1.0$, that is, when the engine operating state is one in which the air-fuel mixture should be made rich or the stoichiometric air-fuel ratio, the routine proceeds to step 118, where the count D is incremented by one. Next, at step 119, it is judged if the count D has become larger than the constant value $D_0$. When $\beta > D_0$, the routine proceeds to step 120, where $\Sigma NO_x$ is made zero. That is, when the combustion of the rich air-fuel ratio or the stoichiometric air-fuel ratio continues for a certain time, it may be considered that all of the $NO_x$ has been released from the $NO_x$ absorbent 17, so at this time the estimated value $\Sigma NO_x$ of the amount of $NO_x$ absorbed in the $NO_x$ absorbent 17 is made zero.

Figure 14:
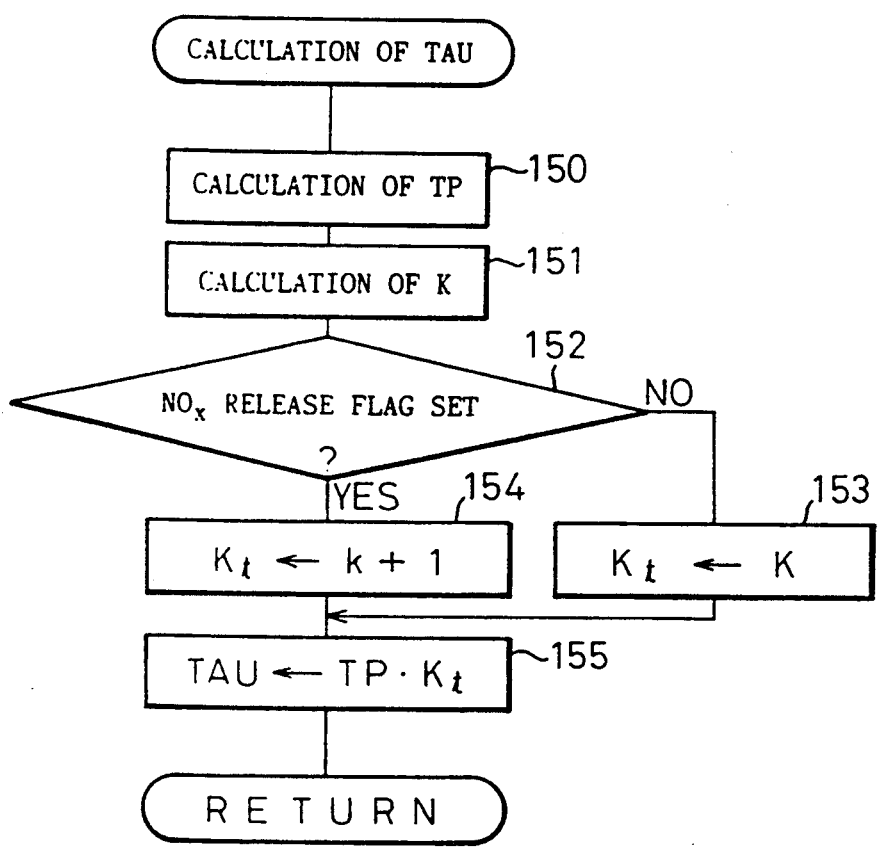
FIG. 14 is a flow chart for calculating the fuel injection time TAU.

FIG. 14 shows the routine for calculation of the fuel injection time TAU. This routine is repeatedly executed.

Referring to FIG. 14, first, at step 150, a basic fuel injection time TP is calculated from a map indicated in FIG. 2. Subsequently, at step 151, the correction coefficient K shown in FIG. 3, which is determined in accordance with the operating state of the engine, is calculated. Next, at step 152, it is judged if the $NO_x$ release flag is set or not. When the $NO_x$ release flag is not set, the routine proceeds to step 153, where the correction coefficient K is made $K_t$. Next, at step 155, $K_t$ is multiplied with the basic fuel injection time TP, whereby the fuel injection time TAU is calculated. Accordingly, at this time, the air-fuel mixture which is fed into the combustion chamber 3 is made lean, the stoichiometric air-fuel ratio, or rich in accordance with the operating state of the engine as shown in FIG. 3.

On the other hand, when it is judged at step 152 that the $NO_x$ release flag is set, the routine proceeds to step 154, where it is made the sum (k+1) of correction coefficient k calculated by the routine shown in FIG. 12 and FIG. 13 and 1, then the routine proceeds to step 155. Next, at this time, the air-fuel mixture fed to the combustion chamber 3 is made rich, then the degree of richness is changed by the pattern shown in FIG. 9.

FIG. 15 to FIG. 20 show a second embodiment. As mentioned earlier, in the first embodiment, when the estimated value $\Sigma NO_x$ of the amount of $NO_x$ absorbed in the $NO_x$ absorbent 17 exceeded the $NO_x$ absorption capacity $NO_xCAP$ of the $NO_x$ absorbent 17, the air-fuel ratio of the air-fuel mixture fed to the combustion chamber 3 was switched from lean to rich and the $NO_x$ was released from the $NO_x$ absorbent 17, but further, even during engine high load operation and engine full load operation, a releasing action of the $NO_x$ from the $NO_x$ absorbent 17 is performed. In the second embodiment, even in engine operating states other than engine high load operation and engine full load operation, the air-fuel mixture is made rich and a $NO_x$ release action from the $NO_x$ absorbent 17 is performed. At this time, when all of the $NO_x$ absorbed in the $NO_x$ absorbent 17 is considered to have been released, the estimated value $\Sigma NO_x$ of the amount of $NO_x$ absorbed in the $NO_x$ absorbent 17 is made zero.

That is, in the first embodiment, as will be understood from FIG. 3, when an acceleration operation is performed in which the engine load is made to increase in the low load region, that is, when a gradual acceleration operation is performed, the air-fuel mixture is maintained lean, while when an acceleration operation is performed in which the engine load shifts from the low load to high load, that is, a rapid acceleration operation is performed, the air-fuel mixture is switched from lean to the stoichiometric air-fuel ratio. As opposed to this, in the second embodiment, during rapid acceleration operation, the air-fuel mixture is made a rich air-fuel mixture in accordance with the degree of acceleration to secure a good acceleration operation and at that time the $NO_x$ release action is performed.

Further, when a shift down is performed in the automatic transmission 22, the engine rotational speed increases, but at this time, if there is a delay in the increase of the engine rotational speed, a torque shock is produced when the shift down occurs. Therefore, in the second embodiment, when a shift down is performed, the air-fuel mixture is made rich to immediately raise the engine rotational speed and thereby the occurrence of a torque shock is inhibited. At this time too, the $NO_x$ release action is performed.

Further, in the first embodiment, when the estimated value $\Sigma NO_x$ of the $NO_x$ absorbed in the $NO_x$ absorbent 17 reaches the $NO_x$ absorption capacity $NO_xCAP$ shown in FIG. 7, the air-fuel mixture is switched from lean to rich and a $NO_x$ release action is performed, but in the second embodiment, when the estimated value $\Sigma NO_x$ of the $NO_x$ absorbed in the $NO_x$ absorbent 17 reaches 70 percent of the $NO_x$ absorption capacity $NO_xCAP$ shown in FIG. 7, the air-fuel mixture is switched from lean to rich and the $NO_x$ release action is performed.

Further, in the second embodiment, during idling operation in which the throttle valve 14 is open for idling and during a deceleration operation, the air-fuel ratio of the air-fuel mixture fed to the combustion chamber 3 is made the stoichiometric air-fuel ratio. However, when the air-fuel mixture is made rich to cause the $NO_x$ to be released, it takes less in fuel consumption and there is less fluctuation in the torque if the air-fuel ratio of the air-fuel mixture is switched between the stoichiometric air-fuel ratio and rich rather than if the air-fuel ratio of the air-fuel mixture is switched between lean and rich. Accordingly, in the second embodiment, to increase the opportunities for causing the $NO_x$ to be released by switching the air-fuel ratio of the air-fuel mixture from the stoichiometric air-fuel ratio to rich, in the case where the estimated value $\Sigma NO_x$ of the amount of the $NO_x$ absorbed in the $NO_x$ absorbent 17 exceeds 30 percent of the NOx absorption capacity $NO_xCAP$ shown in FIG. 7, when the throttle valve 14 is open in the idling position, the air-fuel mixture is temporarily made rich to perform the $NO_x$ release action. In this case, if the $NO_x$ release action is ended, the air-fuel mixture is maintained at the stoichiometric air-fuel ratio.

Next, an explanation will be made of a second embodiment of the control of release of $NO_x$ with reference to FIG. 15 to FIG. 19.

Figure 15:
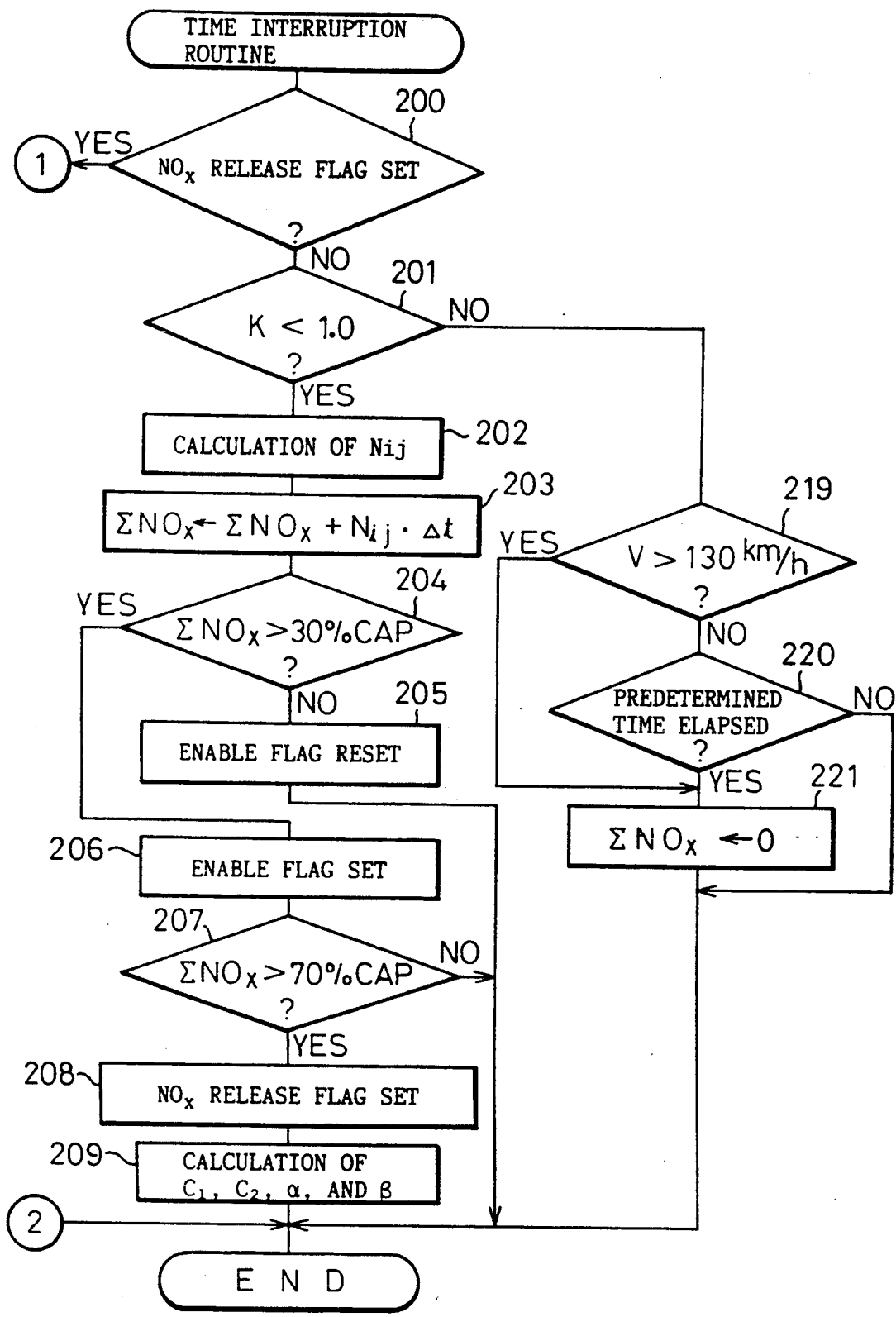
FIG. 15 and FIG. 16 are flow charts showing a time interruption routine of another embodiment.
Figure 16:
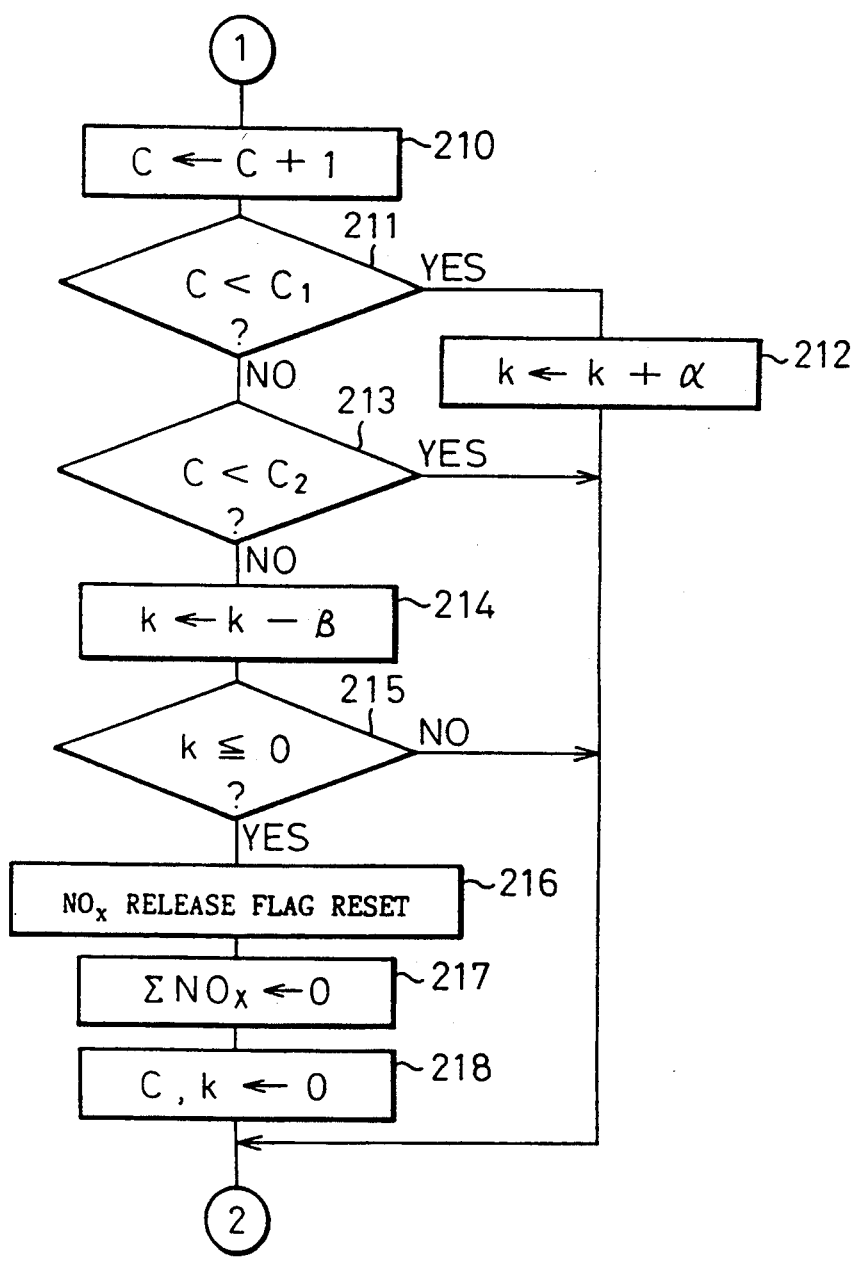

FIG. 15 and FIG. 16 show a time interruption routine executed by interruption every predetermined time.

Referring to FIG. 15 and FIG. 16, first, at step 200, it is judged if a $NO_x$ release flag showing that the $NO_x$ should be released from the $NO_x$ absorbent 17 is set or not. When the $NO_x$ release flag is not set, the routine proceeds to step 201, where it is judged if the correction coefficient K is smaller than 1.0, that is, if the operating state is one in which the air-fuel mixture should be made lean. When $K < 1.0$, that is, when the operating state is one in which the air-fuel mixture should be made lean, the routine proceeds to step 202.

At step 202, the $NO_x$ amount Nij discharged from the engine per unit time is calculated from the map shown in FIG. 6(B) based on the absolute pressure PM in the surge tank 10, detected by the pressure sensor 19, and the engine rotational speed N. Next, at step 203, the $NO_x$ amount Nij is multiplied by the interruption time interval $\Delta t$ and the product Nij·$\Delta T$ is added to $\Sigma NO_x$. The product Nij·$\Delta t$ shows the estimated value of the amount of the $NO_x$ absorbed in the $NO_x$ absorbent 17. Next, at step 204, it is judged if the estimated value $\Sigma NO_x$ of the amount of the $NO_x$ absorbed in the $NO_x$ absorbent 17 is greater than 30 percent CAP, that is, 30 percent of the $NO_x$ absorption capacity $NO_xCAP$ shown in FIG. 7. When $\Sigma NO_x \leq 30$ percent CAP, the routine proceeds to step 205, where the enable flag is reset, then the processing cycle is ended. As opposed to this, when $\Sigma NO_x > 30$ percent CAP, the routine proceeds to step 206, where the enable flag is set, then the routine proceeds to step 207.

At step 207, it is judged if the estimated value $\Sigma NO_x$ of the amount of the $NO_x$ absorbed in the $NO_x$ absorbent 17 is greater than 70 percent CAP, that is, 70 percent of the $NO_x$ absorption capacity $NO_xCAP$ shown in FIG. 7. When $\Sigma NO_x \leq 70$ percent CAP, the processing cycle ends.

On the other hand, if it is judged at step 207 that $\Sigma NO_x > 70$ percent CAP, that is, if it is judged that over 70 percent of the $NO_x$ of the $NO_x$ absorption capacity is absorbed in the $NO_x$ absorbent 17, the routine proceeds to step 208, where the $NO_x$ release flag is set. Next, at step 209, $C_1$, $C_2$, $\alpha$, and $\beta$ are calculated from the relationship shown in FIG. 10 on the basis of the temperature T of the exhaust gas and the processing cycle ends. If the $NO_x$ release flag is set, at the next processing cycle, the routine proceeds from step 200 to step 210, where the count is incremented by one. Next, at step 111, it is judged if the count C is smaller than $C_1$. When $C < C_1$, the routine proceeds to step 212, $\alpha$ is added to the correction coefficient k. Next, the processing cycle ends. The action of addition of $\alpha$ to the correction coefficient k is performed continuously until $C \geq C_1$. Accordingly, the value of the correction coefficient k continues to increase during this period as shown in FIG. 9.

On the other hand, if it is judged at step 211 that $C \geq C_1$, the routine proceeds to step 213, where it is judged if the count C has become smaller than even $C_2$. When $C < C_2$, the processing cycle ends. Therefore, as shown in FIG. 9, the correction coefficient k is held constant until $C \geq C_2$.

Next, if it is judged at step 213 that $C \geq C_2$, the routine proceeds to step 214, where $\beta$ is subtracted from the correction coefficient k. Next, at step 215, it is judged if the correction coefficient k has become zero or a negative number. When $k > 0$, the processing cycle ends. Therefore, as shown in FIG. 9, the correction coefficient k is reduced until $k \leq 0$. Note that as mentioned later, when $k > 0$, the air-fuel mixture fed into the combustion chamber 3 is made rich and during this time the degree of richness is changed by the pattern shown in FIG. 9.

On the other hand, if it is judged at step 215 that $k \leq 0$, the routine proceeds to step 216, where the $NO_x$ release flag is reset. Next, at step 217, $\Sigma NO_x$ is made zero. That is, at this time, it is considered that all of the $NO_x$ which had been absorbed in the $NO_x$ absorbent 17 has been released, so the estimated valve $\Sigma NO_x$ of the $NO_x$ absorbed in the $NO_x$ absorbent 17 is made zero. Next, at step 218, the count C and the correction coefficient k are made zero and the processing cycle is ended.

On the other hand, if it is judged at step 201 that $k \geq 1.0$, that is, the engine operating state is one in which the air-fuel mixture should be made rich or the stoichiometric air-fuel ratio, the routine proceeds to step 219, where it is judged if the vehicle speed V is greater than a constant value, for example, 130 km/h, from the output signal of the vehicle speed sensor 24. If the operation is performed so that the vehicle speed V exceeds 130 km/h, the $NO_x$ is completely released from the $NO_x$ absorbent 17, so at this time the routine proceeds to step 221, where the estimated value $\Sigma NO_x$ of the amount of $NO_x$ absorbed in the $NO_x$ absorbent 17 is made zero. As opposed to this, when $V \leq 130$ km/h, the routine proceeds to step 220, where it is judged if a predetermined time has past from when $k \geq 1.0$. When a predetermined time has past, the routine proceeds to step 221, where $\Sigma NO_x$ is made zero. That is, when the combustion of a rich air-fuel mixture or an air-fuel mixture with a stoichiometric air-fuel ratio continues for a predetermined time, it is considered that all the $NO_x$ has been released from the $NO_x$ absorbent 17, so at this time, the estimated value $\Sigma NO_x$ of the amount of $NO_x$ absorbed in the $NO_x$ absorbent 17 is made zero.

Figure 17:
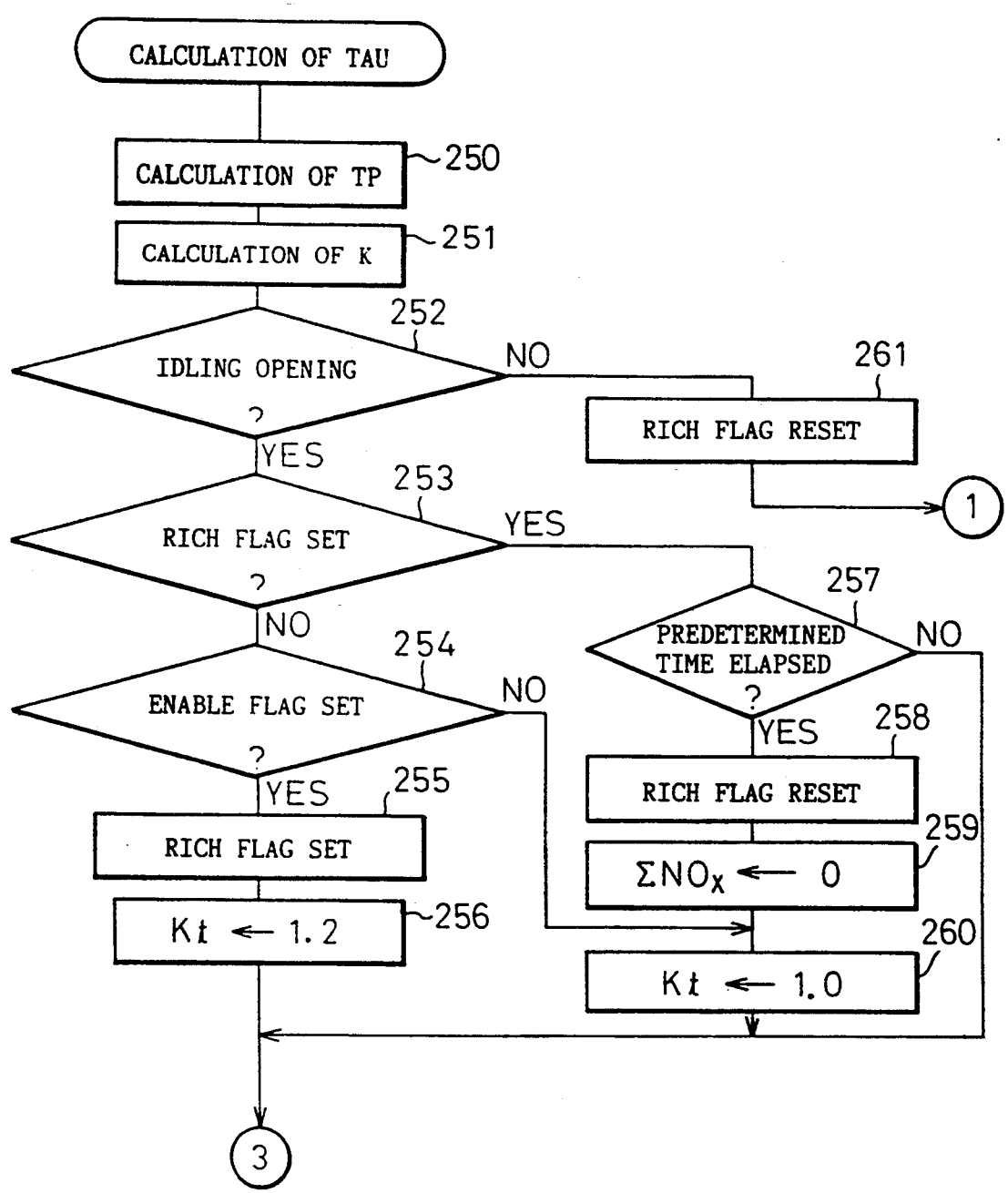
FIG. 17 to FIG. 19 are a flow chart for calculating the fuel injection time TAU of another embodiment.
Figure 18:
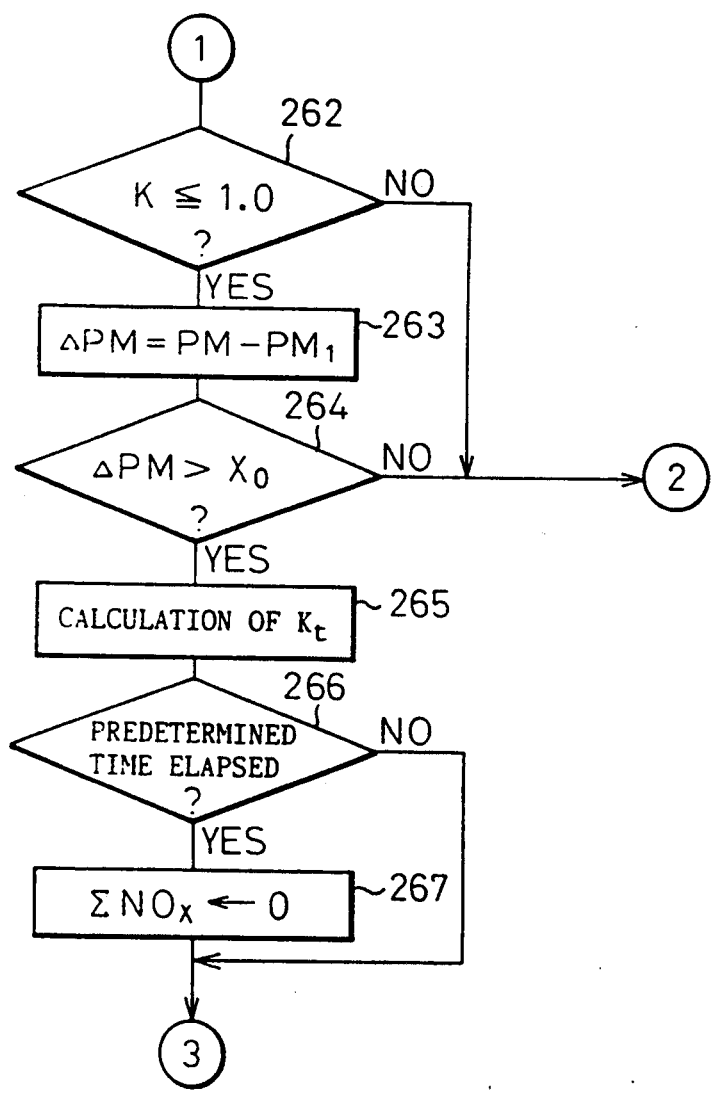
Figure 19:
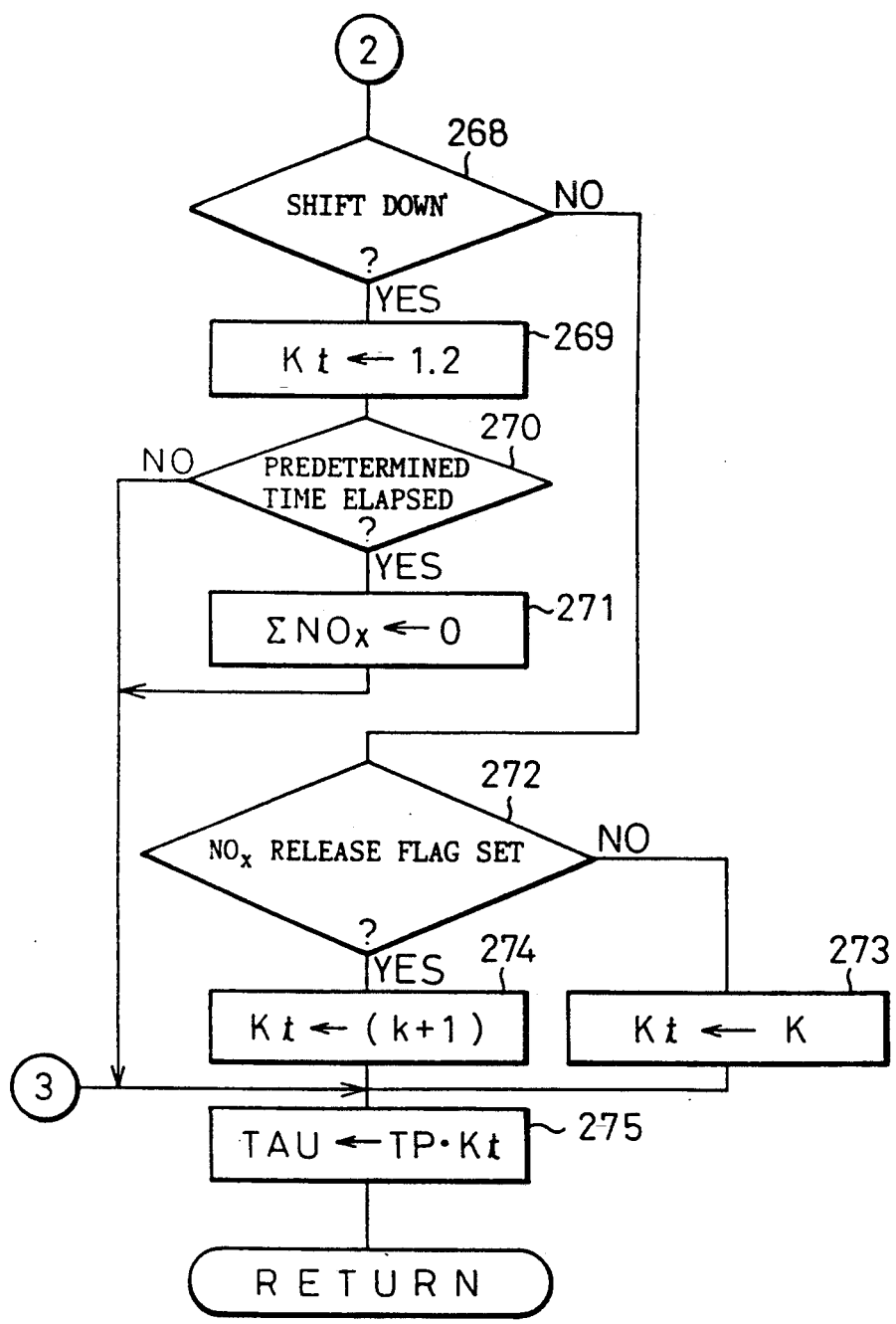

FIG. 17 to FIG. 19 show the routine for calculating the fuel injection time TAU. This routine is repeatedly executed.

Referring to FIG. 17 to FIG. 19, first, at step 250, the basic fuel injection time TP is calculated from the map shown in FIG. 2. Next, at step 251, the correction coefficient K shown in FIG. 3, determined in accordance with the operating state of the engine, is calculated. Next, at step 252, it is judged if the throttle valve 14 is open for idling on the basis of the output signal of the idle switch 20. When the throttle valve 14 is not open for idling, the routine proceeds to step 261, where the rich flag is reset, then the routine proceeds to step 262.

At step 262, it is judged if the correction coefficient K is smaller than 1.0. When $K \geq 1.0$, that is, when the air-fuel ratio of the air-fuel mixture should be made rich or the stoichiometric air-fuel ratio, the routine jumps to step 268. As opposed to this, when $K \leq 1.0$, that is, when the air-fuel ratio of the air-fuel mixture should be made lean, the routine proceeds to step 263, where the pressure difference $\Delta PM$ between the current absolute pressure PM in the surge tank 10 and the absolute pressure $PM_1$ in the surge tank 10 which is detected in the previous processing cycle is calculated. Next, at step 264, it is judged if the pressure difference $\Delta PM$ is larger than a constant value $X_0$, that is, if a rapid acceleration operation is underway. When $\Delta PM \leq X_0$, that is, when a rapid acceleration operation is not underway, the routine proceeds to step 268.

At step 268, it is judged if a shift down action of the automatic transmission is being performed on the basis of the output signal of the gear position detector 23. When a shift down action is not underway, the routine jumps to step 272. At step 272, it is judged if the $NO_x$ release flag is set or not. When the $NO_x$ release flag is not set, the routine proceeds to step 273, where the correction coefficient K is made $K_t$. Next, at step 275, $K_t$ is multiplied with the basic fuel injection time TP, whereby the fuel injection time TAU is calculated. Accordingly, at this time, the air-fuel mixture fed into the combustion chamber 3 is made lean or the stoichiometric air-fuel ratio or rich in accordance with the operating state of the engine as shown in FIG. 3.

On the other hand, if it is judged at step 274 that the $NO_x$ release flag is set, the routine proceeds to step 274, where $K_t$ is made the sum of the correction coefficient k calculated by the routine shown in FIG. 15 and FIG. 16 and 1, then the routine proceeds to step 275. Therefore, at this time, the air-fuel mixture fed into the combustion chamber 3 is made rich. At this time, the degree of richness is changed by the pattern shown in FIG. 9.

On the other hand, when it is judged at step 252 that the throttle valve 14 is open in the idling position, the routine proceeds to step 253, where it is judged if the rich flag is set or not. If the rich flag is not set, the routine proceeds to step 254, where it is judged if the enable flag is set or not. When the enable flag is set, the routine proceeds to step 255, where the rich flag is set, then at step 256, the correction coefficient $K_t$ is made 1.2. Next, the routine proceeds to step 275. As opposed to this, when the enable flag is not set, the routine proceeds to step 260, where the correction coefficient $K_t$ is made 1.0, then the routine proceeds to step 275.

Accordingly, when the throttle valve 14 is open to the idling position, if the enable flag is set, that is, when over 30 percent of the $NO_x$ absorption capacity $NO_x$-CAP of the $NO_x$ is absorbed in the $NO_x$ absorbent 17, the air-fuel mixture is made rich. At this time, when the amount of $NO_x$ absorbed in the $NO_x$ absorbent 17 is less than 30 percent of the $NO_x$ absorption capacity $NO_x$-CAP, the air-fuel ratio of the air-fuel mixture is made the stoichiometric air-fuel ratio.

If the rich flag is set, the routine proceeds from step 253 to step 257, where it is judged if a predetermined time has elapsed since the rich flag has been set. When the predetermined time has elapsed, the routine proceeds to step 258, where the rich flag is reset, then at step 259 the estimated value $\Sigma NO_x$ of the amount of $NO_x$ absorbed in the $NO_x$ absorbent 17 is made zero. Next, at step 260, the correction coefficient $K_t$ is made 1.0. If the $\Sigma NO_x$ is made zero at step 259, the enable flag is reset in the routine shown in FIG. 15 and FIG. 16, so at the next processing cycle, the routine proceeds through steps 253 and 254 to step 260. Therefore, when the estimated value $\Sigma NO_x$ of the amount of $NO_x$ absorbed in the $NO_x$ absorbent 17 is over 30 percent of the $NO_x$ absorption capacity $NO_x$CAP, the air-fuel mixture is temporarily made rich, then the air-fuel ratio of the air-fuel mixture is made the stoichiometric air-fuel ratio.

Figure 20:
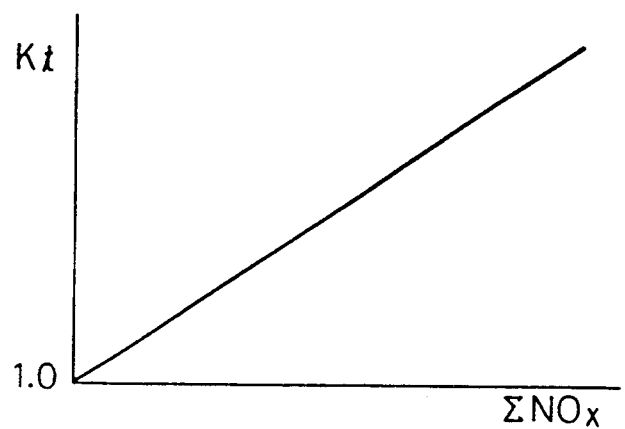
FIG. 20 is a graph showing the correction coefficient $K_t$.

On the other hand, if it is judged at step 264 that $\Delta PM > X_0$, that is, during a rapid acceleration operation, the routine proceeds to step 265, where the correction coefficient $K_t$ is calculated from the estimated value $\Sigma NO_x$ of the amount of $NO_x$ absorbed in the $NO_x$ absorbent 17 on the basis of the relationship shown in FIG. 20. As shown in FIG. 20, the correction coefficient $K_t$ is larger than 1 and the correction coefficient $K_t$ becomes larger the larger the estimated value $\Sigma NO_x$. Accordingly, if a rapid acceleration operation is performed, the air-fuel mixture is made rich. Next, at step 266, it is judged if a predetermined time has elapsed since $\Delta PM > X_0$. If the predetermined time has elapsed, the routine proceeds to step 267, where the estimated value $\Sigma NO_x$ of the amount of $NO_x$ absorbed in the $NO_x$ absorbent 17 is made zero.

On the other hand, when it is judged at step 268 that a shift down action is underway at the automatic transmission 22, the routine proceeds to step 269, where the correction coefficient $K_t$ is made 1.2. Therefore, when a shift down action is performed, it is understood, the air-fuel mixture immediately is made rich. Next, at step 270, it is judged if a predetermined time has elapsed from when the shift down action was started. When a predetermined time has elapsed, the routine proceeds to step 271, where the estimated value $\Sigma NO_x$ of the amount of $NO_x$ absorbed in the $NO_x$ absorbent 17 is made zero.

Note that if the air-fuel mixture is made rich for a certain time to release the $NO_x$, then the estimated value $\Sigma NO_x$ of the amount of $NO_x$ absorbed in the $NO_x$ absorbent 17 is made zero at steps 259, 267, and 271, but at this time it is also possible not to make the estimated value $\Sigma NO_x$ zero, but to make the estimated value $\Sigma NO_x$ about 30 percent or lower of the $NO_x$ absorption capacity $NO_x$CAP.

Figure 21:
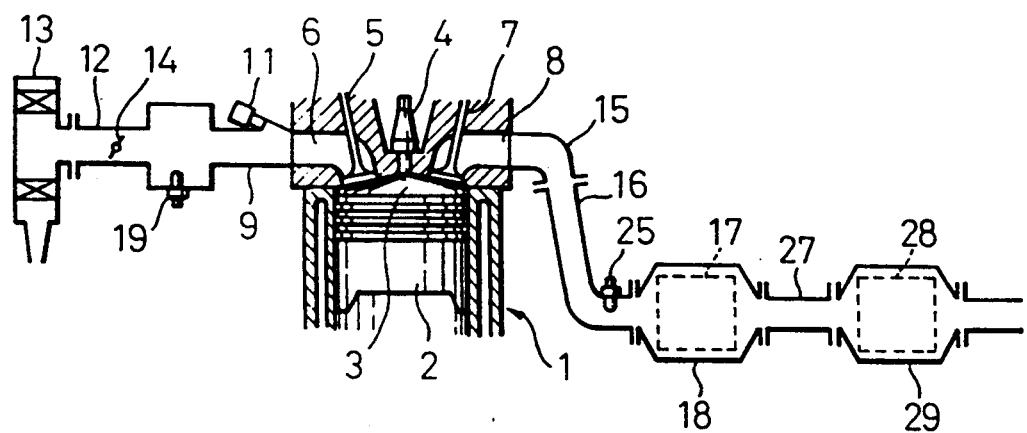
FIG. 21 is an overall view of an internal combustion engine showing another embodiment.

FIG. 21 shows another embodiment of the internal combustion engine. In this embodiment, an outlet side of a casing 18 is connected through an exhaust pipe 27 to a catalytic converter 29 housing a three-way catalyst. This three-way catalyst 28, as is well known, exhibits a high purification efficiency with respect to CO, HC, and $NO_x$ when the air-fuel ratio is maintained near the stoichiometric air-fuel ratio, but the three-way catalyst 28 also has a high purification efficiency with respect to $NO_x$ even when the air-fuel ratio becomes rich to a certain extent. In the embodiment shown in FIG. 21, a three-way catalyst 28 is provided downstream of the $NO_x$ absorbent 17 so as to remove the $NO_x$ using this characteristic.

That is, as is mentioned above, if the air-fuel mixture fed into the engine cylinder is made rich to release the $NO_x$ from the $NO_x$ absorbent 17, the $NO_x$ absorbed in the $NO_x$ absorbent 17 is rapidly released from the $NO_x$ absorbent 17. At this time, the $NO_x$ is reduced during its release, but there is a possibility that all of the $NO_x$ will not be reduced. If the three-way catalyst 28 is disposed downstream of the $NO_x$ absorbent 17, however, the $NO_x$ which could not be reduced at the time of the release of the $NO_x$ is reduced by the three-way catalyst 28. Accordingly, by disposing the three-way catalyst 28 downstream of the $NO_x$ absorbent 17, it becomes possible to improve considerably the purification performance of the $NO_x$.

In the embodiments discussed up to here, use was made, as the $NO_x$ absorbent, of a $NO_x$ absorbent 17 comprised of at least one of an alkali metal, alkali earth, and rare earth and a precious metal carried on alumina. Instead of using such a $NO_x$ absorbent 17, however, it is also possible to use a complex oxide of an alkali earth and copper, that is, a $NO_x$ absorbent of the Ba-Cu-O system. As such a complex oxide of an alkali earth and copper, use may be made for example of $MnO_2$·$BaCuO_2$. In this case, it is also possible to add platinum Pt or cerium Ce. In a $NO_x$ absorbent of the $MnO_2$·$BaCuO_2$ system, the copper Cu performs the same catalytic function as the platinum Pt in the $NO_x$ absorbent 17 spoken of up to now. When the air-fuel ratio is lean, the $NO_x$ is oxidized by the copper ($2NO + O_2 \rightarrow 2NO_2$) and dispersed in the absorbent in the form of nitric acid ions $NO_3^-$.

On the other hand, if the air-fuel ratio is rich, similarly, $NO_x$ is released from the absorbent. This $NO_x$ is reduced by the catalytic action of the copper Cu. The $NO_x$ reducing ability of copper Cu, however, is weaker than the $NO_x$ reducing ability of platinum Pt and therefore when using an absorbent of the Ba-Cu-O system, the amount of $NO_x$ which is not reduced at the time of release of the $NO_x$ becomes somewhat greater than with the $NO_x$ absorbent 17 discussed up to now. Therefore, when using an absorbent of the Ba-Cu-O system, as shown in FIG. 21, it is preferable to dispose a three-way catalyst 28 downstream of the absorbent.

Figure 22:
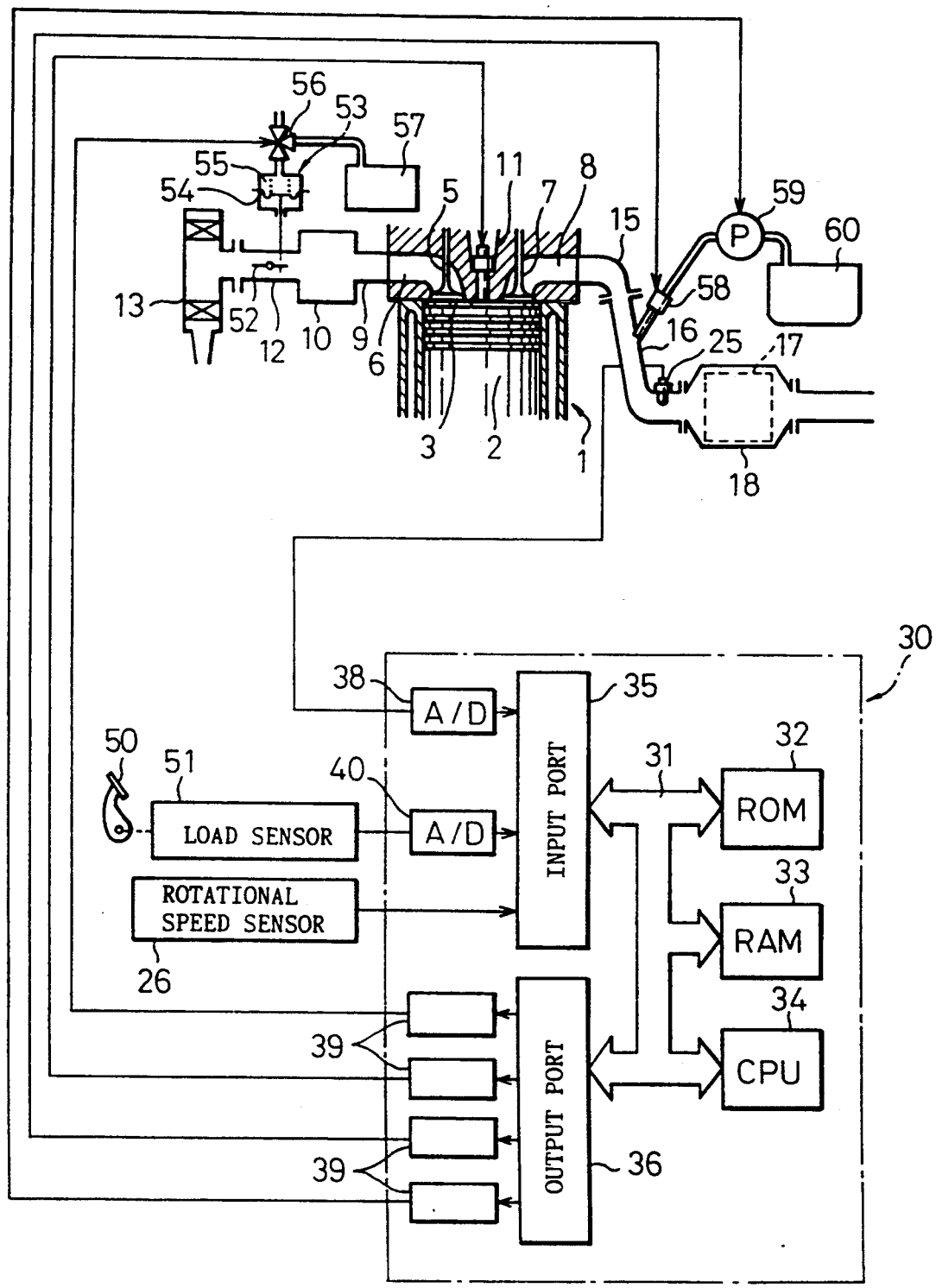
FIG. 22 is an overall view of an internal combustion engine showing still another embodiment.
Figure 27:
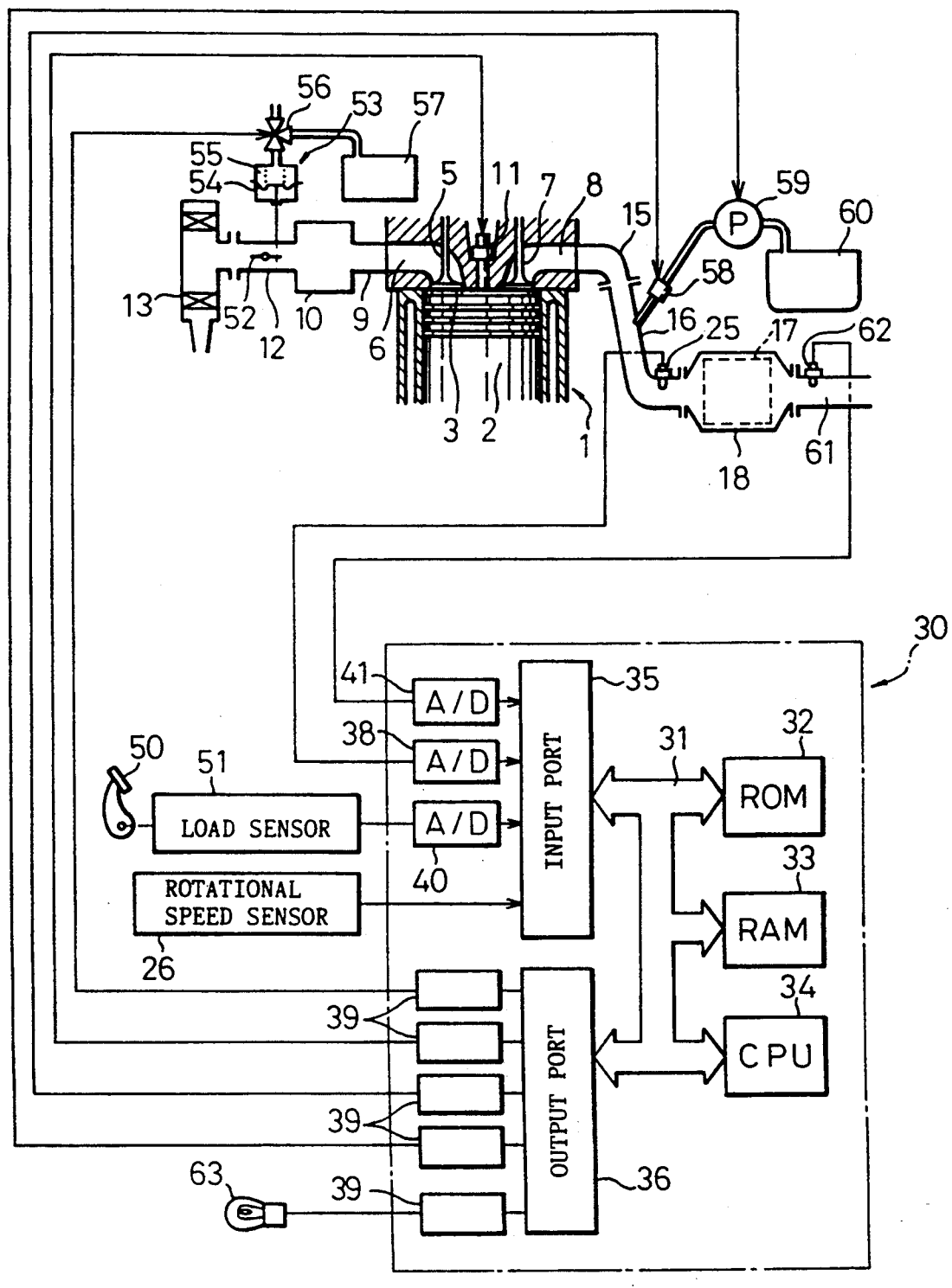
FIG. 27 is an overall view of a diesel engine showing still another embodiment.

FIG. 22 and FIG. 27 show the case of application of the present invention to a diesel engine. Note that in FIG. 22 and FIG. 27, constituent elements the same as those in FIG. 1 are given the same reference numerals.

In a diesel engine, usually, during all operating states, combustion is performed with an air excess rate of over 1.0, that is, with the average air-fuel ratio of the air-fuel mixture in the combustion chamber 3 in a lean state. Accordingly, at this time, the $NO_x$ which is discharged is absorbed in the $NO_x$ absorbent 17. On the other hand, when $NO_x$ is to be released from the $NO_x$ absorbent 17, hydrocarbons are fed into the engine exhaust passage upstream of the $NO_x$ absorbent 17, whereby the air-fuel ratio of the exhaust gas flowing into the $NO_x$ absorbent 17 becomes rich.

Referring to FIG. 22, in this embodiment, provision is made of a load sensor 51 which generates an output voltage proportional to the amount of depression of the accelerator pedal 50. The output voltage of the load sensor 51 is input to the input port 35 through an AD converter 40. Further, in this embodiment, an intake shutoff valve 52 is disposed in the intake duct 12, which intake shutoff valve 52 is connected to a diaphragm 54 of the vacuum diaphragm apparatus 53. The diaphragm vacuum chamber 55 of the vacuum diaphragm apparatus 53 is connected selectively to the atmosphere or a vacuum tank 57 through a solenoid switching valve 56. On the other hand, the output port 36 of the electronic control unit 30 is connected through a corresponding drive circuit 39 to a solenoid switching valve 56. The diaphragm vacuum chamber 55 is usually open to the atmosphere. At this time, the intake shutoff valve 52 is held in the fully open position as shown in FIG. 22.

Further, a reducing agent feed valve 58 is disposed in the exhaust pipe 16, which reducing agent feed valve 58 is connected through a feed pump 59 to a reducing agent tank 60. The output port 36 of the electronic control unit 30 is connected through the corresponding drive circuit 39 to the reducing agent feed valve 58 and the feed pump 59. Inside the reducing agent tank 60 is filled a hydrocarbon such as gasoline, isooctane, hexane, heptane, gas oil, and kerosine or a hydrocarbon which can be stored in a liquid form, such as butane or propane.

In the diesel engine shown in FIG. 22 too, the amount of the $NO_x$ which is absorbed in the $NO_x$ absorbent 17 is estimated from the amount of $NO_x$ in the exhaust gas discharged from the engine. That is, in the diesel engine as well, the higher the engine rotational speed N, the greater the amount of the exhaust gas discharged per unit time from the engine, so along with a rise in the engine rotational speed N, the amount of $NO_x$ discharged per unit time from the engine increases. Further, the higher the engine load, that is, the greater the amount of depression of the accelerator pedal 50, the greater the amount of exhaust gas discharged from the combustion chambers 3 and further the higher the combustion temperature, so the higher the engine load, that is, the greater the amount of depression of the accelerator pedal 50, the greater the amount of the $NO_x$ discharged per unit time from the engine.

Figure 23A:
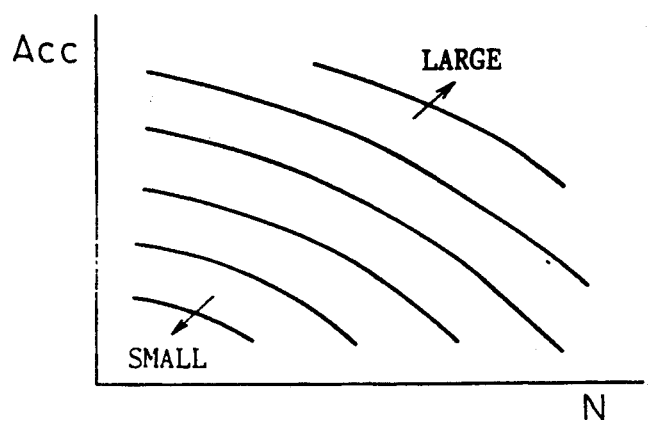
FIG. 23 is a graph showing the amount of $NO_x$ discharged from the engine.

FIG. 23(A) shows the relationship between the amount of $NO_x$ discharged from an engine per unit time, the amount of depression Acc of the accelerator pedal 50, and the engine rotational speed N, found by experiments. In FIG. 23(A), the curves show the same amounts of $NO_x$. As shown in FIG. 23(A), the amount of $NO_x$ which is discharged from the engine per unit time increases along with an increase in the amount of depression Acc of the accelerator pedal 50 and increases along with an increase in the engine rotational speed N. Note that the amount of $NO_x$ shown in FIG. 23(A) is stored in the ROM 32 in advance in the form of a map shown in FIG. 23(B).

Figure 24:
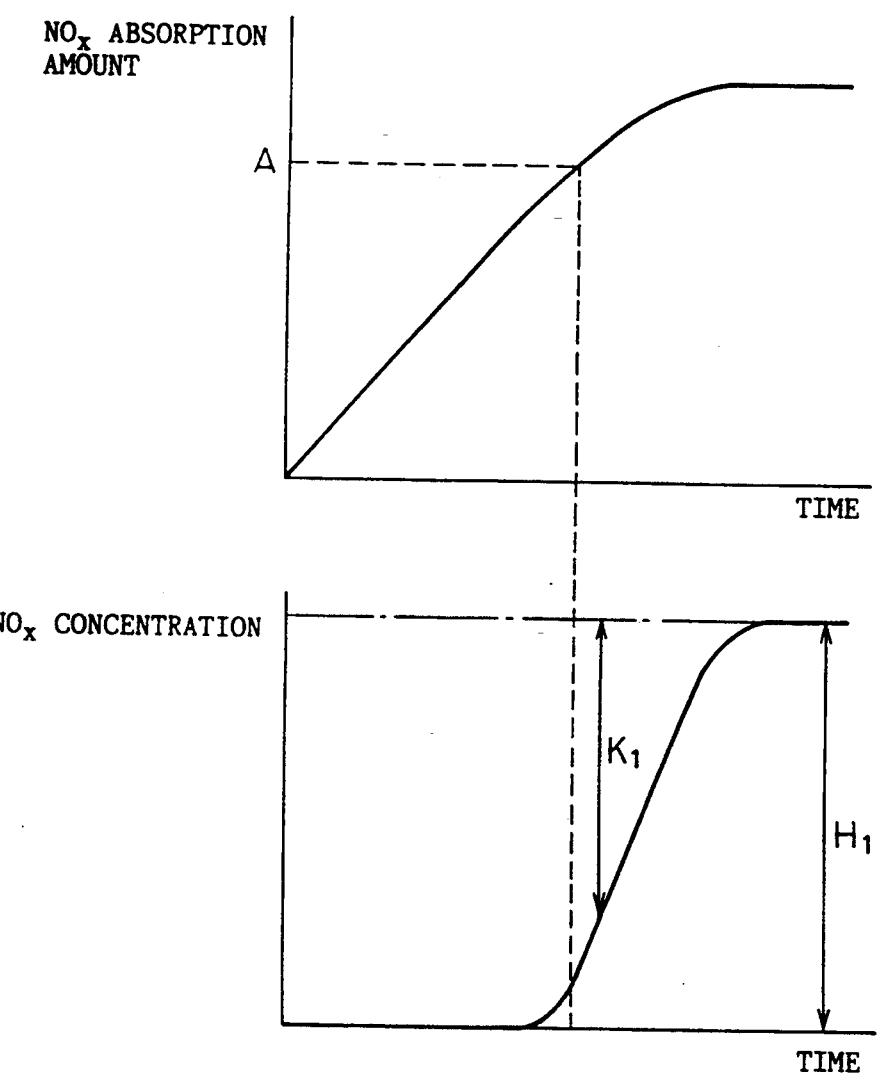
FIG. 24 is a graph showing the $NO_x$ absorption characteristic of a $NO_x$ absorbent.

In a diesel engine, the air-fuel mixture inside the combustion chamber 3 is made to burn in an excessive air state, that is, in a state with the average air-fuel ratio lean. At this time, the $NO_x$ discharged from the engine is absorbed in the $NO_x$ absorbent 17. FIG. 24 shows the relationship between the amount of $NO_x$ absorbed in the $NO_x$ absorbent 17 and the concentration of $NO_x$ in the exhaust gas flowing out from the $NO_x$ absorbent 17. Further, in FIG. 24, the amount of absorption A of the $NO_x$ shows the allowable absorption limit amount below which the $NO_x$ absorbent 17 can absorb $NO_x$ well.

As will be understood from FIG. 24, when the amount $NO_x$ absorption is smaller than the allowable absorption limit amount A, all of the $NO_x$ in the exhaust gas is absorbed in the $NO_x$ absorbent 17, so at this time the concentration of the $NO_x$ in the exhaust gas flowing out from the $NO_x$ absorbent 17 becomes zero. As opposed to this, if the amount of absorption of $NO_x$ exceeds the allowable absorption limit amount A, the $NO_x$ absorption rate gradually falls along with the increase of the amount of absorption of $NO_x$, therefore the concentration of $NO_x$ in the exhaust gas flowing out from the $NO_x$ absorbent 17 gradually becomes higher. At this time, if the amount of $NO_x$ in the exhaust gas flowing into the $NO_x$ absorbent 17 is made $H_1$ ($=1.0$), then of the $NO_x$, only $K_1/H_1$ ($=K_1$) is absorbed by the $NO_x$ absorbent 17.

On the other hand, in this embodiment, when a deceleration operation is performed, the $NO_x$ release action is performed. That is, when a deceleration operation is performed, the diaphragm vacuum chamber 55 is connected to the vacuum tank 57 by the switching action of the switching valve 56, whereby the intake shutoff valve 52 is made to close to close to the fully closed position. If the feed pump 61 is driven at the same time, the reducing agent feed valve 58 is made to open, whereby the hydrocarbons filled in the reducing agent tank 60 are fed from the reducing agent feed valve 58 to the inside the exhaust pipe 16. The amount of the hydrocarbons fed at this time is determined so that the air-fuel ratio of the inflowing exhaust gas flowing into the $NO_x$ absorbent 17 becomes rich. Accordingly, at this time, the $NO_x$ is released from the $NO_x$ absorbent 17.

If the intake shutoff valve 52 is made to close in this way, the amount of exhaust gas discharged from the engine falls and therefore a small amount of reducing agent is fed, whereby the air-fuel ratio of the exhaust gas flowing into the $NO_x$ absorbent 17 is made rich. That is, when the $NO_x$ release action is performed, it is possible to close the intake shutoff valve 52 to reduce the amount of consumption of the reducing agent. Further, the only time when there is no effect on the operating state of the engine even when the intake shutoff valve 52 is closed is during deceleration operation. Further, at this time, if the intake shutoff valve 52 is made to close, the engine brake acts powerfully. Accordingly, in the embodiment according to the present invention, the intake shutoff valve 52 is closed at the time of deceleration operation and at that time the $NO_x$ release action is performed.

Figure 25:
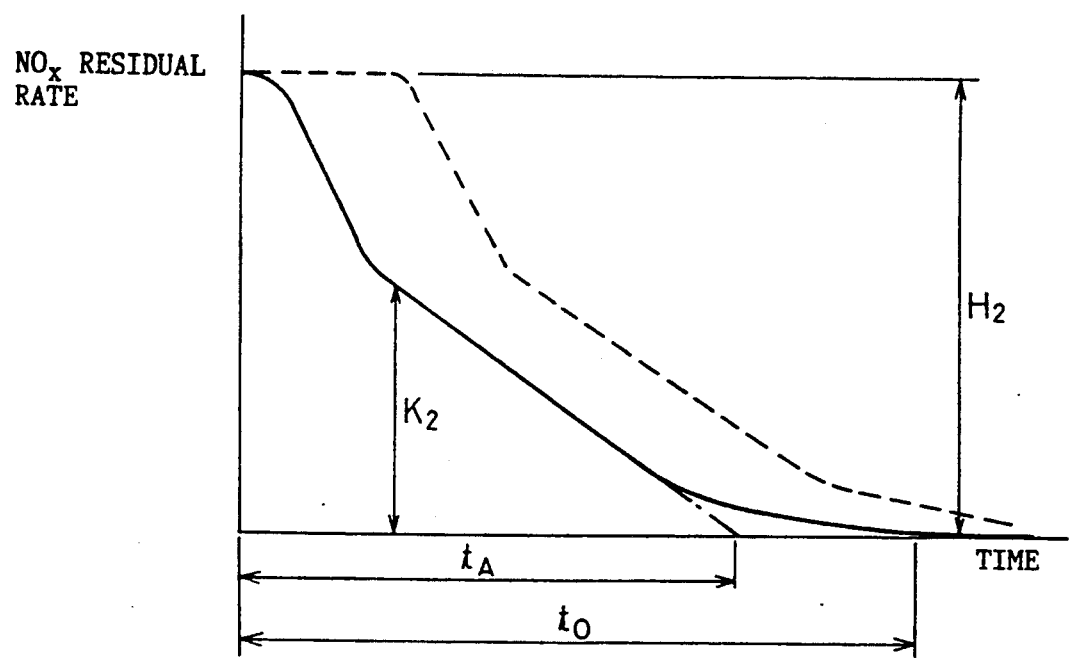
FIG. 25 is a graph showing the residual rate of the $NO_x$ remaining in the $NO_x$ absorbent.

FIG. 25 shows the residual rate of the $NO_x$ which continues to remain in the $NO_x$ absorbent 17 after the start of the release of the $NO_x$. As shown by the solid line in FIG. 25, if the $NO_x$ release action is started, the $NO_x$ residual rate gradually falls. In this case, as shown by the solid line in FIG. 25, the residual amount does not fall uniformly along with the passage of time, but the residual amount of $NO_x$ falls relatively fast in the early part of the $NO_x$ release action and falls relatively gently at the latter part of the same. Further, when use is made of a reducing agent with a relatively low volatility, such as gas oil or kerosine, it takes time for the reducing agent to vaporize, so as shown by the broken line in FIG. 25, even if the reducing agent is fed, the $NO_x$ release action will not be performed immediately and therefore time will be taken until all of the $NO_x$ is released.

As will be understood from FIG. 25, if the $NO_x$ release action is performed for about the time $t_0$, substantially all the $NO_x$ is released from the $NO_x$ absorbent 17. Therefore, in the embodiment according to the present invention, when a deceleration operation is started, the intake shutoff valve 52 is made to close over the time $t_0$ and the reducing agent is fed into the exhaust pipe 16 over the time $t_0$. However, if the period of the deceleration operation is short, the $NO_x$ release action ends up stopped before the $NO_x$ residual rate becomes zero. In such a case, if it is judged that the release action of all of the $NO_x$ has ended, then when the estimated value $\Sigma NO_x$ of the $NO_x$ absorbed in the $NO_x$ absorbent 17 reaches the allowable absorption limit amount A (FIG. 24), if it is attempted to perform the $NO_x$ release action once again, then the absorption ability of the $NO_x$ absorbent 17 will end up becoming saturated before the $NO_x$ release action is performed and therefore a large amount of $NO_x$ will be released into the atmosphere.

However, when the period of the deceleration operation is short and therefore the $NO_x$ residual rate does not become zero, if the $NO_x$ residual rate just before the start of the deceleration operation is made $H_2$ ($=1.0$), then the $NO_x$ residual rate when the $NO_x$ release action is ended is expressed by $K_2/H_2(=K_2)$. Accordingly, in the embodiment according to the present invention, when not all of the $NO_x$ has been released when releasing the $NO_x$, it is estimated that the amount of $NO_x$ of $K_2 \cdot \Sigma NO_x$ continues to remain in the $NO_x$ absorbent 17 and the next performed $NO_x$ release period is made earlier.

Next, an explanation will be given of the control of the release of $NO_x$ referring to FIG. 26. Note that the $NO_x$ release control routine shown in FIG. 26 is executed by interruption every predetermined time period.

Figure 23B:
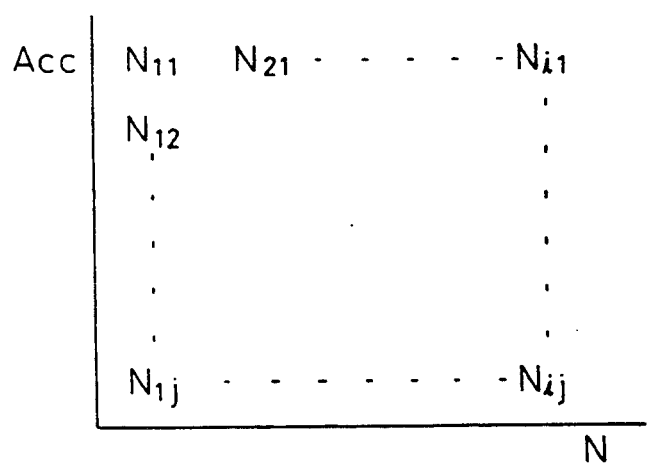
Figure 26:
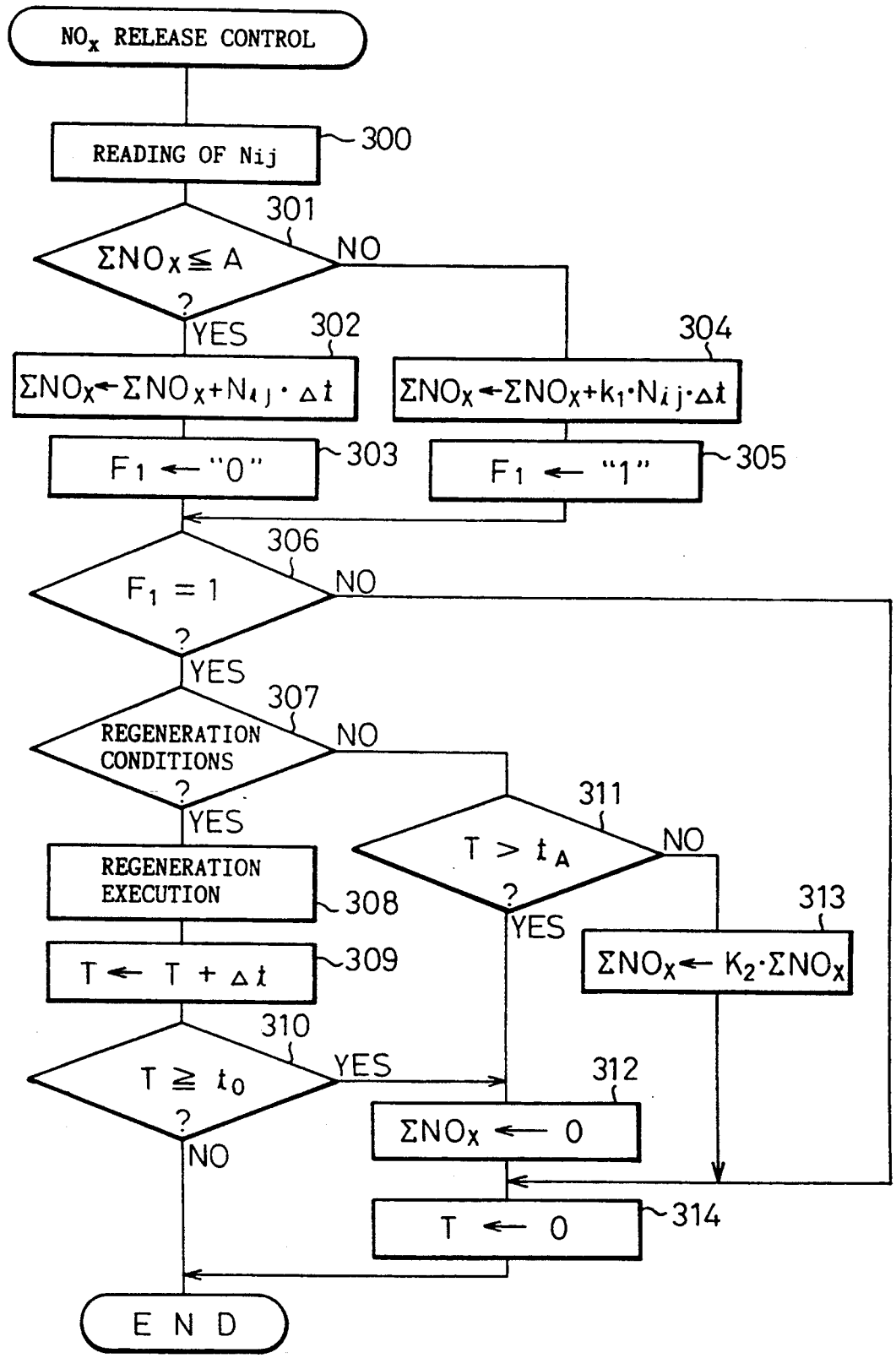
FIG. 26 is a flow chart for controlling release of $NO_x$.

Referring to FIG. 26, first, at step 300, the amount $Nij$ of $NO_x$ discharged from the engine per unit time is calculated from the map shown in FIG. 23(B) based on the amount of depression of the accelerator pedal 50 and the engine rotational speed N. Next, at step 301, it is judged if the estimated value $\Sigma NO_x$ of the amount of $NO_x$ absorbed in the $NO_x$ absorbent 17 has exceeded the allowable absorption limit A (FIG. 24). When $\Sigma NO_x \leq A$, the routine proceeds to step 302, where the interruption time interval $\Delta t$ is multiplied with the amount $Nij$ of the $NO_x$. The product $Nij \cdot \Delta t$ is added to $\Sigma NO_x$. The product $Nij \cdot \Delta t$ expresses the amount of $NO_x$ discharged from the engine in the period of the interruption time interval $\Delta t$ and therefore $\Sigma NO_x$ expresses the estimated value of the amount of $NO_x$ absorbed in the $NO_x$ absorbent 17. Next, at step 303, the execution enable flag $F_1$ for enabling execution of the $NO_x$ release action is reset, then the routine proceeds to step 306.

On the other hand, when it is judged at step 301 that $\Sigma NO_x > A$, the routine proceeds to step 304, where the product $K_1 \cdot Nij \cdot \Delta t$ obtained by multiplying $K_1$ (FIG. 24) with $Nij \cdot \Delta t$ is added to $\Sigma NO_x$. Next, the routine proceeds to step 305, where the execution enable flag is set, then the routine proceeds to step 306. At step 306, it is judged if the execution enable flag has been set. If the execution enable flag has not been set, the routine proceeds to step 314, where the count T is made zero, then the processing cycle is ended.

On the other hand, if it is judged at step 306 that the execution enable flag has been set, the routine proceeds to step 307, where it is judged if the conditions for the $NO_x$ release action, that is, the conditions for regeneration of the $NO_x$, stand or not. In this case, when the amount of depression of the accelerator pedal 50 is zero and the engine rotational speed N is higher than a predetermined rotational speed, that is, during deceleration operation, it is judged that the conditions for regeneration of the $NO_x$ absorbent 17 stand. Note that in this case, it is possible to add to the conditions of regeneration that the temperature of the exhaust gas be at least a temperature able to make the temperature of the $NO_x$ absorbent 17 the activation temperature.

When it is judged at step 307 that the regeneration conditions stand, the routine proceeds to step 308, where the $NO_x$ is regenerated. That is, the intake shutoff valve 52 is made to close and the reducing agent is fed from the reducing agent feed valve 58. Next, at step 309, the interruption time interval $\Delta t$ is added to the count T. Next, at step 310, it is judged if the time T elapsed since the start of regeneration has exceeded $t_0$ (FIG. 25). When $T < t_0$, the processing cycle is ended. As opposed to this, when $T \geq t_0$, the regeneration action of the $NO_x$ absorbent 17 is stopped, then the routine proceeds to step 312, where the estimated amount $\Sigma NO_x$ of the amount of $NO_x$ absorbed in the $NO_x$ absorbent 17 is made zero. Next, the routine proceeds through step 314, whereafter the processing cycle is ended.

On the other hand, when the regeneration conditions no longer stand, the routine proceeds to step 311, where it is judged if the time T elapsed from the start of the regeneration exceeds a predetermined time $t_A$. The predetermined time $T_A$ is a time somewhat shorter than $t_0$ as shown in FIG. 25 and expresses a time wherein it can be deemed that the $NO_x$ residual rate is zero. Accordingly, when $T > T_A$, the routine proceeds to step 312, where the estimated value $\Sigma NO_x$ of the amount of $NO_x$ absorbed in the $NO_x$ absorbent 17 is made zero.

As opposed to this, when it is judged at step 311 that $T \leq t_A$, that is, when the period of the deceleration operation is short and $NO_x$ continues to remain in the $NO_x$ absorbent 17, the routine proceeds to step 313, where the estimated value $\Sigma NO_x$ of the amount of $NO_x$ absorbed in the $NO_x$ absorbent 17 is deemed to be $\Sigma NO_x$ multiplied by $K_2$ (FIG. 25). Accordingly, in the next interruption routine, at step 302, $Nij \cdot \Delta t$ is added to $\Sigma NO_x$.

In the embodiment shown in FIG. 27, a $NO_x$ concentration sensor 62 is disposed in the exhaust passage 60 downstream of the $NO_x$ absorbent 17. This $NO_x$ concentration sensor 62 generates an output voltage proportional to the $NO_x$ concentration in the exhaust gas discharged from the $NO_x$ absorbent 17, which output voltage is input through an AD converter 41 to the input port 35. Further, the output port 36 is connected through a corresponding drive circuit 39 to a warning lamp 63.

In this embodiment too, basically, when the estimated value $\Sigma NO_x$ of the amount of $NO_x$ absorbed in the $NO_x$ absorbent 17 exceeds the allowable limit amount A, if the conditions for regeneration stand, the $NO_x$ is regenerated. Further, in this embodiment, if it is detected that the absorbing ability of the $NO_x$ absorbent 17 has fallen due to the fact that the amount of $NO_x$ actually absorbed is greater than the estimated value $\Sigma NO_x$, the $NO_x$ absorbent 17 has deteriorated, or some other reason and the absorbing ability of the $NO_x$ absorbent 17 falls, the regeneration action of the $NO_x$ absorbent 17 is promoted by prolonging the regeneration period of the $NO_x$ absorbent 17.

Next, an explanation will be made of the control for the release of $NO_x$ referring to FIG. 28 to FIG. 30. Note that the $NO_x$ release control routine shown from FIG. 28 to FIG. 30 is executed by interruption every predetermined time.

Figure 28:
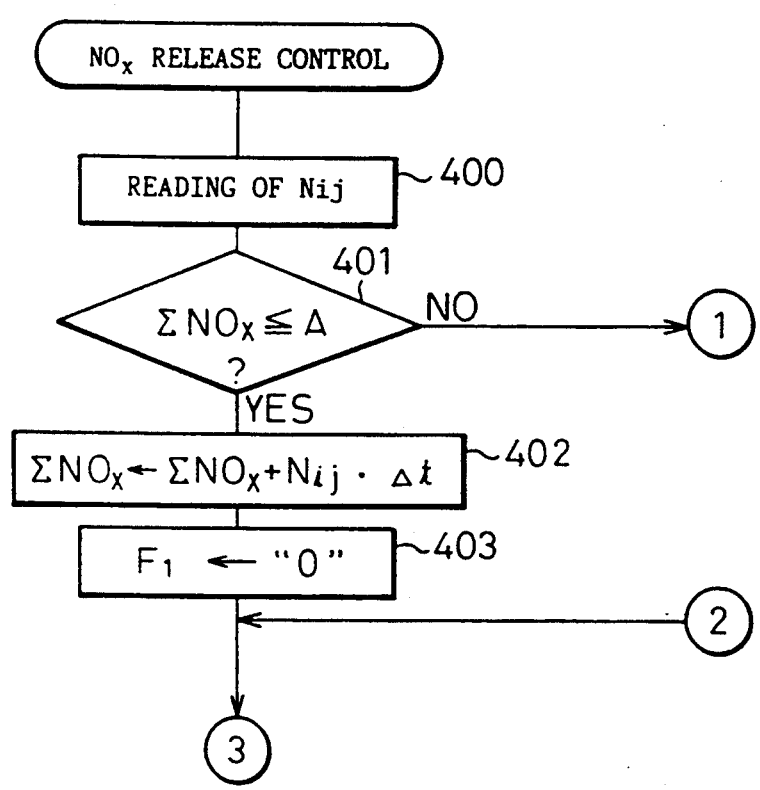
FIG. 28 to FIG. 30 are a flow chart showing the control of $NO_x$ release.
Figure 29:
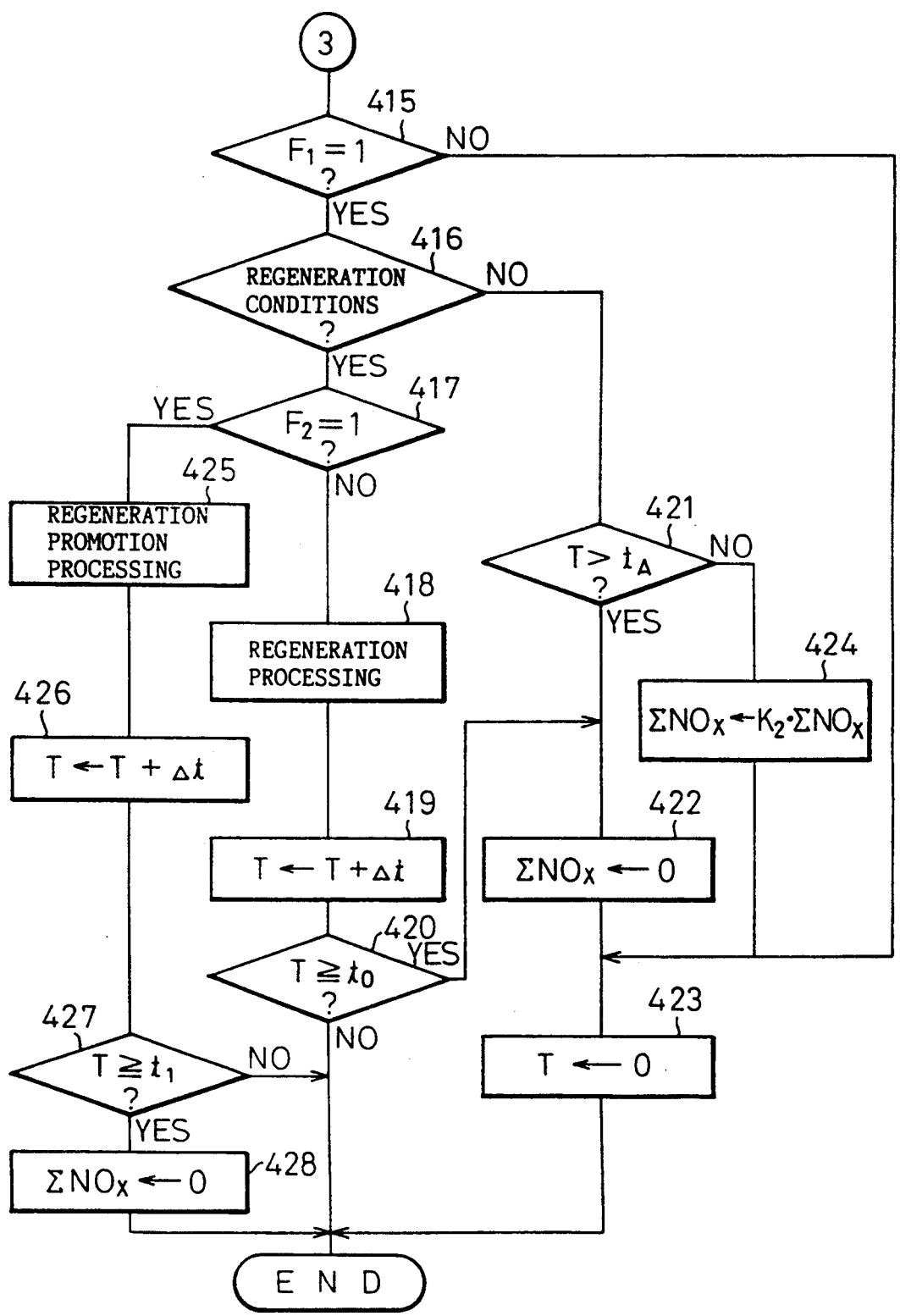
Figure 30:
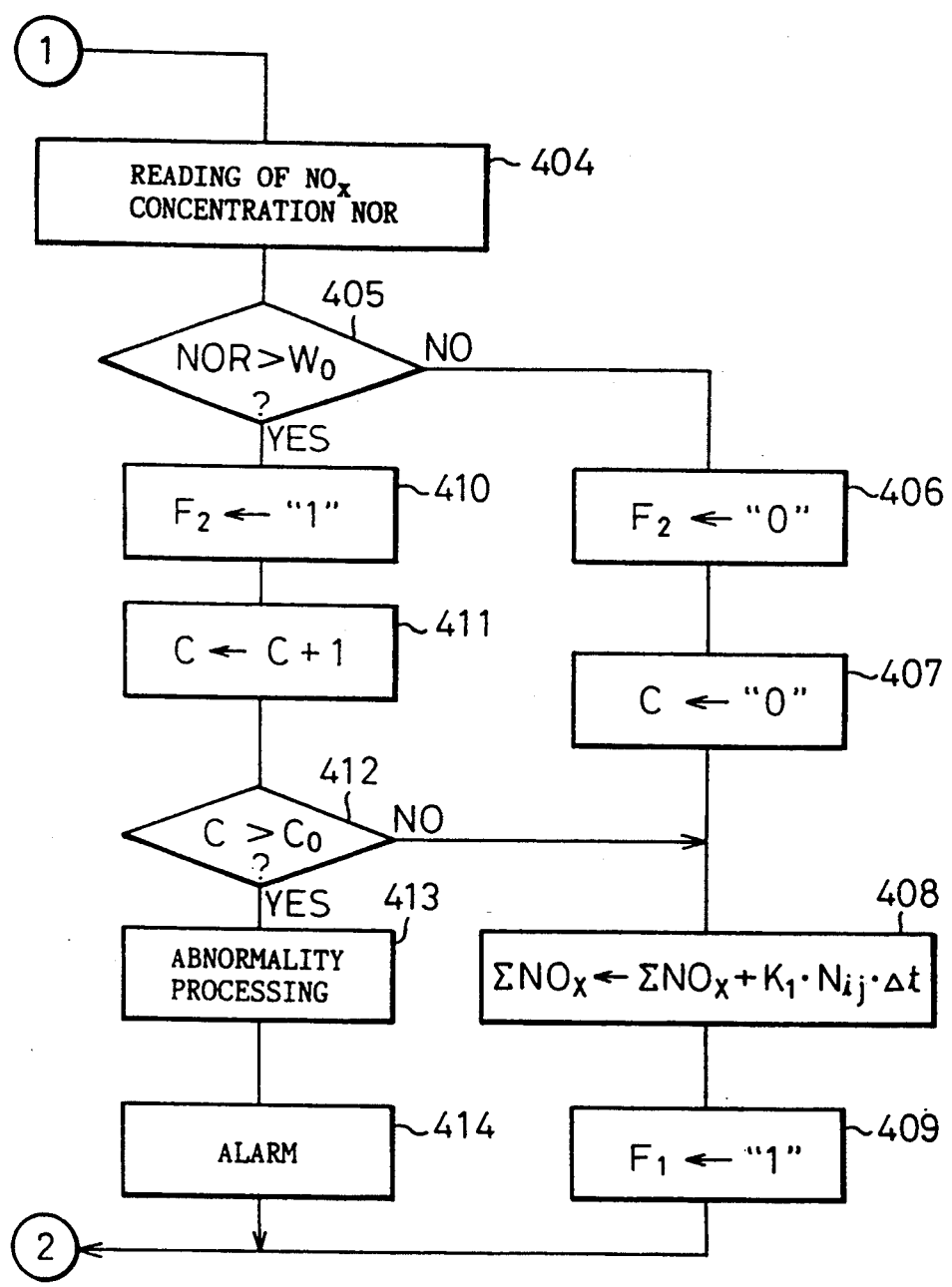

Referring to FIG. 28 to FIG. 30, at step 400, the amount Nij of the $NO_x$ discharged from the engine per unit time is calculated from the map shown in FIG. 23(B) on the basis of the amount of depression of the accelerator pedal 50 and the engine rotational speed N. Next, at step 401, it is judged if the estimated value $\Sigma NO_x$ of the amount of $NO_x$ absorbed in the $NO_x$ absorbent 17 has exceeded the allowable limit amount A (FIG. 24). When $\Sigma NO_x \leq A$, the routine proceeds to step 402, where the interruption time interval $\Delta t$ is multiplied with the amount Nij of the $NO_x$. This product Nij·$\Delta t$ is added to $\Sigma NO_x$. The product Nij·$\Delta t$ expresses the amount of $NO_x$ discharged from the engine in the period of the interruption time interval $\Delta t$ and accordingly $\Sigma NO_x$ expresses the estimated amount of the amount of $NO_x$ absorbed in the $NO_x$ absorbent 17. Next, at step 403, the execution flag $F_1$ for enabling execution of the $NO_x$ release action is reset, then the routine proceeds to step 415.

On the other hand, it is judged at step 401 that $\Sigma NO_x > A$, the routine proceeds to step 404, where the $NO_x$ concentration NOR detected by the $NO_x$ concentration sensor 62 is read. Next, at step 405, it is judged if the $NO_x$ concentration NOR is larger than a predetermined value $W_0$. When NOR$\leq W_0$, the $NO_x$ has not deteriorated and therefore it is considered that an amount of $NO_x$ as estimated is absorbed in the $NO_x$ absorbent 17, so the routine proceeds to step 406, where the regeneration promotion flag $F_2$ showing that the regeneration of the $NO_x$ absorbent 17 should be promoted is reset. Next, at step 407, the count C is made zero, then at step 408, the product $K_1$·Nij·$\Delta t$ obtained by multiplying $K_1$ (FIG. 24) with Nij·$\Delta t$ is added to $\Sigma NO_x$. Next, the routine proceeds to step 409, where the execution enable flag is set, then the routine proceeds to step 415. At step 415, it is judged if the execution enable flag is set. If the execution enable flag is not set, the routine proceeds to step 423, where the count T is made zero, then the processing cycle is ended.

On the other hand, if it is judged at step 415 that the execution enable flag is set, the routine proceeds to step 416, where it is judged if the condition for the $NO_x$ release action, that is, the conditions for regeneration of the $NO_x$ absorbent 17, stand. In this case, when the amount of depression of the accelerator pedal 50 is zero and the engine rotational speed N is higher than a predetermined rotational speed, as mentioned earlier, that is, during deceleration operation, it is judged that the conditions for regeneration of the $NO_x$ absorbent 17 stand.

When it is judged at step 416 that the conditions for regeneration stand, the routine proceeds to step 417, where it is judged if the regeneration promotion flag is set. When the regeneration promotion flag is not set, the routine proceeds to step 148, where the $NO_x$ absorbent 17 is regenerated. That is, the intake shutoff valve 52 is made to close and the reducing agent is fed from the reducing agent feed valve 58. Next, at step 419, the interruption time interval $\Delta t$ is added to the count T. Next, at step 420, it is judged if the time T elapsed from the start of the regeneration exceeds $t_0$ (FIG. 25). When $T < t_0$, the processing cycle is ended. As opposed to this, when $T \geq t_0$, the regeneration action of the $NO_x$ absorbent 17 is stopped and the routine proceeds to step 422, where the estimated value $\Sigma NO_x$ of the amount of $NO_x$ absorbed in the $NO_x$ is made zero. Next, the routine proceeds through step 423 and the processing cycle is ended.

On the other hand, when the regeneration conditions no longer stand, the routine proceeds to step 416, where it is judged if the time T elapsed from the start of regeneration exceeds a predetermined time $t_4$. This predetermined time $T_4$ is a time somewhat shorter than $t_0$ and expresses the time during which the $NO_x$ residual rate is deemed to be zero, as mentioned earlier. Therefore, when $T > t_4$, the routine proceeds to step 422, where the estimated value $\Sigma NO_x$ of the amount of $NO_x$ absorbed in the $NO_x$ absorbent 17 is made zero.

As opposed to this, when it is judged at step 421 that $T \leq t_4$, that is, when the period of the deceleration operation is short and the $NO_x$ continues to remain in the $NO_x$ absorbent 17, the routine proceeds to step 424, where the estimated value $\Sigma NO_x$ of the amount of the $NO_x$ absorbed in the $NO_x$ absorbent 17 is deemed to be the product of the multiplication of $K_2$ (FIG. 25) with $\Sigma NO_x$.

On the other hand, if it is judged at step 405 that NOR$> W_0$, that is, if it is judged that the $NO_x$ concentration is high, the routine proceeds to step 410, where the regeneration promotion flag $F_2$ is set, then at step 411, the count C is incremented by one. Next, at step 412, it is judged if the count C has become larger than the predetermined value $C_0$. When $C \leq C_0$, the routine proceeds to step 408. Next, the routine proceeds through step 409 and 415 to step 416.

Next, if it is judged at step 416 that the regeneration conditions stand, the routine proceeds through step 417 to step 405, where the processing for promotion of regeneration is performed. In this processing of promotion of regeneration, for example, the voltage applied to the feed pump 59 is made to increase and the amount of feed of the reducing agent is made to increase. Alternatively, a burner (not shown) is disposed in the exhaust passage upstream of the $NO_x$ absorbent 17 and the temperature of the exhaust gas is raised by the burner. Next, at step 426, the interruption time interval $\Delta t$ is added to the count T, then at step 427, it is judged if the time T elapsed from the start of the regeneration promotion processing has become greater than a predetermined time $t_1$. This predetermined time $t_1$ is a time longer than $t_0$ at step 420. When $T \geq t_1$, the regeneration promotion processing of the $NO_x$ absorbent 17 is stopped, then the routine proceeds to step 428, where the estimated value $\Sigma NO_x$ of the amount of $NO_x$ absorbed in the $NO_x$ absorbent 17 is made zero.

So long as the $NO_x$ absorbent 17 does not deteriorate and no abnormalities occur, if the regeneration promotion processing is performed once or the regeneration promotion processing is performed several times, when $\Sigma NO_x \geq A$ once again, it is judged at step 405 that $NOR \leq W_0$. If the $NO_x$ absorbent 17 deteriorates or an abnormality occurs, however, even if the regeneration processing is performed several times, it is judged at step 405 that $NOR > W_0$, therefore at step 412 it is judged that $C > C_0$. In this case, the routine proceeds to step 413, where for example the regeneration execution flag $F_1$ is reset and wasteful regeneration processing is prohibited or other abnormality processing performed. Next, at step 414, for example, the warning lamp 63 is lit and the fact that an abnormality has occurred in the $NO_x$ absorbent 17 is notified to the driver.

We claim:

1. An exhaust purification device of an internal combustion engine which has in an engine exhaust passage a $NO_x$ absorbent which absorbs $NO_x$ when the air-fuel ratio of the inflowing exhaust gas is lean and which releases the absorbed $NO_x$ when the oxygen concentration in the inflowing exhaust gas is reduced and which is provided with a $NO_x$ estimating means for estimating the amount of the $NO_x$ absorbed by the $NO_x$ absorbent and a $NO_x$ releasing means for reducing the oxygen concentration in the exhaust gas flowing into the $NO_x$ absorbent and releasing $NO_x$ from the $NO_x$ absorbent when the amount of the $NO_x$ estimated to be absorbed in the $NO_x$ absorbent by the $NO_x$ estimating means exceeds a predetermined allowable value.

2. An exhaust purification device of an internal combustion engine according to claim 1, wherein said $NO_x$ estimating means estimates the $NO_x$ absorbed in the $NO_x$ absorbent on the basis of the amount of $NO_x$ discharged from the combustion chamber to the engine exhaust passage.

3. An exhaust purification device of an internal combustion engine according to claim 2, wherein said $NO_x$ estimating means is comprised of a $NO_x$ calculating means for calculating the amount of $NO_x$ discharged per unit time from the engine to the engine exhaust passage in accordance with the engine load and the engine rotational speed and an cumulative adding means for cumulatively adding the amounts of $NO_x$ calculated by the $NO_x$ calculating means.

4. An exhaust purification device of an internal combustion engine according to claim 3, wherein said $NO_x$ calculating means is provided with a memory in which is previously stored the amount of $NO_x$ discharged per unit time from the engine to the engine exhaust passage as a function of the engine load and the engine rotational speed and wherein the cumulative adding means cumulatively adds the amounts of $NO_x$ stored in the memory and determined from the engine load and the engine rotational speed.

5. An exhaust purification device of an internal combustion engine according to claim 3, wherein provision is made of a throttle valve disposed in the engine intake passage for controlling the engine load and the vacuum inside the engine intake passage downstream of the throttle valve is used as a value representing the engine load.

6. An exhaust purification device of an internal combustion engine according to claim 3, wherein an accelerator pedal is provided for controlling the engine load and the amount of depression of the accelerator pedal is used as a value representing the engine load.

7. An exhaust purification device of an internal combustion engine according to claim 1, wherein said allowance is the maximum $NO_x$ absorption capacity of the $NO_x$ absorbent.

8. An exhaust purification device of an internal combustion engine according to claim 1, wherein said allowance is a predetermined amount of absorption smaller than the maximum $NO_x$ absorption capacity of the $NO_x$ absorbent.

9. An exhaust purification device of an internal combustion engine according to claim 1, wherein said allowance is a function of a temperature representing the temperature of the $NO_x$ absorbent.

10. An exhaust purification device of an internal combustion engine according to claim 9, wherein the temperature representing the temperature of the $NO_x$ absorbent is the temperature of the exhaust gas.

11. An exhaust purification device of an internal combustion engine according to claim 1, wherein said $NO_x$ releasing means switches from lean to rich the air-fuel ratio of the exhaust gas flowing into the $NO_x$ absorbent in a predetermined time when the amount of the $NO_x$ estimated by the $NO_x$ estimating means exceeds the allowance.

12. An exhaust purification device of an internal combustion engine according to claim 11, wherein said $NO_x$ releasing means switches from lean to rich the air-fuel ratio of the air-fuel mixture fed to the combustion chamber for a predetermined time when the amount of $NO_x$ estimated by the $NO_x$ estimating means exceeds the allowance.

13. An exhaust purification device of an internal combustion engine according to claim 11, which is provided with a reducing agent feeding means for feeding a reducing agent into the engine exhaust passage upstream of the $NO_x$ absorbent and wherein said $NO_x$ releasing means causes the reducing agent to be fed from said reducing agent feeding means into the engine exhaust passage upstream of the $NO_x$ absorbent for a predetermined time when the amount of $NO_x$ estimated by the $NO_x$ estimating means exceeds the allowance.

14. An exhaust purification device of an internal combustion engine according to claim 13, wherein said reducing agent is comprised of a hydrocarbon.

15. An exhaust purification device of an internal combustion engine according to claim 14, wherein the hydrocarbon is at least one hydrocarbon selected from gasoline, isooctane, hexane, heptane, butane, propane, gas oil, and kerosine.

16. An exhaust purification device of an internal combustion engine according to claim 11, wherein said $NO_x$ releasing means switches from lean to rich the air-fuel ratio of the exhaust gas flowing into the $NO_x$ absorbent in a predetermined time during a deceleration operation when the amount of the $NO_x$ estimated by the $NO_x$ estimating means exceeds the allowance.

17. An exhaust purification device of an internal combustion engine according to claim 16, wherein an intake shutoff valve which is normally fully open and is closed during deceleration operation is disposed inside the engine exhaust passage.

18. An exhaust purification device of an internal combustion engine according to claim 11, wherein said $NO_x$ estimating means makes the amount of the $NO_x$ estimated to be absorbed in the $NO_x$ absorbent zero when the air-fuel ratio of the exhaust gas flowing into the $NO_x$ absorbent is made rich during the above predetermined time.

19. An exhaust purification device of an internal combustion engine according to claim 11, wherein said $NO_x$ estimating means estimates that $NO_x$ remains in the $NO_x$ absorbent when the air-fuel ratio of the exhaust gas flowing into the $NO_x$ absorbent is made rich for a time shorter than the above predetermined time.

20. An exhaust purification device of an internal combustion engine according to claim 19, wherein said $NO_x$ estimating means estimates the amount of the $NO_x$ absorbed in the $NO_x$ absorbent taking into consideration the amount of $NO_x$ remaining in the $NO_x$ absorbent.

21. An exhaust purification device of an internal combustion engine according to claim 19, wherein said $NO_x$ estimating means causes the amount of the $NO_x$ estimated to be remaining in the $NO_x$ absorbent to increase the shorter the time in which the air-fuel ratio of the exhaust gas flowing into the $NO_x$ absorbent is made rich.

22. An exhaust purification device of an internal combustion engine according to claim 21, wherein provision is made of a memory which stores in advance the relationship between the time during which the air-fuel ratio of the exhaust gas flowing into the $NO_x$ absorbent is made rich and the residual rate of the $NO_x$ estimated to be remaining in the $NO_x$ absorbent and wherein said $NO_x$ estimating means estimates the amount of the $NO_x$ remaining in the $NO_x$ absorbent on the basis of the residual rate of the $NO_x$ stored in the memory.

23. An exhaust purification device of an internal combustion engine according to claim 11, wherein a $NO_x$ concentration detecting means is provided for detecting the concentration of $NO_x$ in the exhaust gas flowing out from the $NO_x$ absorbent and a $NO_x$ release promoting means is provided for promoting the releasing action of the $NO_x$ from the $NO_x$ absorbent when the concentration of $NO_x$ is higher than a predetermined concentration when the amount of the $NO_x$ estimated by the $NO_x$ estimating means exceeds the allowance.

24. An exhaust purification device of an internal combustion engine according to claim 23, wherein said $NO_x$ release promoting means promotes the release action of $NO_x$ by prolonging the time during which the air-fuel ratio of the exhaust gas flowing into the $NO_x$ absorbent is made rich.

25. An exhaust purification device of an internal combustion engine according to claim 23, wherein said $NO_x$ release promoting means promotes the release action of $NO_x$ by raising the degree of richness of the air-fuel ratio of the exhaust gas flowing into the $NO_x$ absorbent.

26. An exhaust purification device of an internal combustion engine according to claim 23, which is provided with a deterioration judging means for judging the $NO_x$ absorbent is deteriorating when the concentration of $NO_x$ is higher than a predetermined concentration when the amount of the $NO_x$ estimated by said $NO_x$ estimating means exceeds the allowance even when the promoting action of the release of said $NO_x$ by the $NO_x$ release promoting means has been performed more than a predetermined number of times.

27. An exhaust purification device of an internal combustion engine according to claim 1, wherein said $NO_x$ estimating means estimates the amount of the $NO_x$ absorbed in the $NO_x$ absorbent taking into consideration the reduction in the $NO_x$ absorption capacity when the $NO_x$ absorption capacity of the $NO_x$ absorbent has fallen.

28. An exhaust purification device of an internal combustion engine according to claim 27, wherein provision is made of a memory for storing in advance the relationship between the time in which the air-fuel ratio of the exhaust gas flowing into the $NO_x$ absorbent 17 is made lean and the $NO_x$ absorption capacity of the $NO_x$ absorbent and wherein said $NO_x$ estimating means estimates the amount of the $NO_x$ absorbed in the $NO_x$ absorbent on the basis of the $NO_x$ absorption capacity stored in the memory.

29. An exhaust purification device of an internal combustion engine according to claim 1, wherein an air-fuel ratio control means is provided for making the air-fuel ratio of the air-fuel mixture fed to the combustion chamber rich in accordance with the operating state of the engine regardless of whether the amount of $NO_x$ estimated by the $NO_x$ estimating means exceeds the allowance.

30. An exhaust purification device of an internal combustion engine according to claim 29, wherein said air-fuel ratio control means makes the air-fuel ratio of the air-fuel mixture fed into the combustion chamber rich when the engine load is higher than a predetermined load.

31. An exhaust purification device of an internal combustion engine according to claim 29, wherein said air-fuel ratio control means makes the air-fuel ratio of the air-fuel mixture fed to the combustion chamber rich when shifting to idling operation.

32. An exhaust purification device of an internal combustion engine according to claim 29, wherein said air-fuel ratio control means makes the air-fuel ratio of the air-fuel mixture fed into the combustion chamber rich during an acceleration operation where the degree of acceleration is larger than a predetermined value.

33. An exhaust purification device of an internal combustion engine according to claim 29, wherein said air-fuel ratio control means makes the air-fuel ratio of the air-fuel mixture fed into the combustion chamber rich during a shift down action of the transmission.

34. An exhaust purification device of an internal combustion engine according to claim 29, wherein said $NO_x$ estimating means makes the amount of $NO_x$ estimated as being absorbed in the $NO_x$ absorbent zero when the air-fuel ratio of the air-fuel mixture is made rich for more than a predetermined time.

35. An exhaust purification device of an internal combustion engine according to claim 1, wherein the $NO_x$ absorbent includes at least one substance selected from alkali metals such as potassium, sodium, lithium, and cesium, alkali earths such as barium and calcium, and rare earths such as lanthanum and yttrium and platinum.

36. An exhaust purification device of an internal combustion engine according to claim 1, wherein the $NO_x$ absorbent is comprised of a compound oxide of barium and copper.

37. An exhaust purification device of an internal combustion engine according to claim 1, wherein a three-way catalyst is disposed in the engine exhaust passage downstream of the $NO_x$ absorbent.

* * * * *

UNITED STATES PATENT AND TRADEMARK OFFICE
CERTIFICATE OF CORRECTION

PATENT NO. : 5,437,153
DATED : August 1, 1995
INVENTOR(S) : Shinichi TAKESHIMA, et al.

Page 1 of 2

It is certified that error appears in the above-indentified patent and that said Letters Patent is hereby corrected as shown below:

Column 2, line 6, before "reduce" insert --substantially-- and after "reduce" delete "well".

Column 2, line 39, change "engine," to --engine;--.

Column 6, line 8, change "19" to --17--.

Column 10, line 1, change "$k_2$" to --102--.

Column 11, line 9, change "Do" to --D--.

Column 14, line 67, change "274" to --272--.

Column 15, line 65, delete "it is understood".

Column 16, line 42, delete "up to here" and insert --above-- after "discussed".

Column 17, line 47, change "too" to --also--.

Column 18, line 44, delete "to close" second occurrence.

Column 18, line 49, between "inside" and "the" insert --of--.

UNITED STATES PATENT AND TRADEMARK OFFICE
CERTIFICATE OF CORRECTION

PATENT NO. : 5,437,153
DATED : August 1, 1995
INVENTOR(S) : Shinichi TAKESHIMA, et al.

It is certified that error appears in the above-indentified patent and that said Letters Patent is hereby corrected as shown below:

Column 21, line 39, delete "of the" at end of line.

Column 21, line 40, delete "amount".

Column 22, line 26, change "416" to --421--.

Column 22, line 54, change "405" to --425--.

Column 25, line 55, between "judging" and "the" insert --that--.

Column 25, line 58, change "when" to --and--.

Column 22, line 11, change "148" to --418 --.

Signed and Sealed this

Fifth Day of March, 1996

BRUCE LEHMAN

Attest:

Attesting Officer

Commissioner of Patents and Trademarks